United States Patent
Ross et al.

(10) Patent No.: US 6,574,311 B1
(45) Date of Patent: Jun. 3, 2003

(54) APPARATUS AND METHOD FOR DETECTING A BRIDGED TAP AND/OR AN END-OF-LINE OF A CONVENTIONAL TELEPHONE LINE USING DELAY-LINE TIME-DOMAIN REFLECTOMETRY

(75) Inventors: Rebecca Webb Ross, Apollo, PA (US); Regis J. Nero, Jr., Export, PA (US); Christopher S. Detka, Tarentum, PA (US)

(73) Assignee: Tollgrade Communications, Inc., Wilmington, DE (US)

( * ) Notice: Subject to any disclaimer, the term of this patent is extended or adjusted under 35 U.S.C. 154(b) by 95 days.

(21) Appl. No.: 09/792,726

(22) Filed: Feb. 23, 2001

(51) Int. Cl.[7] .............................................. H04M 1/24
(52) U.S. Cl. ........................ 379/27.08; 379/2; 379/1.04
(58) Field of Search ............................ 379/27.01, 27.08, 379/27.03, 22.03, 30, 1.04, 2; 333/18, 166; 324/500, 512, 527, 532, 533, 76.12, 76.19; 706/15, 25, 20; 702/194; 348/625, 672

(56) References Cited

U.S. PATENT DOCUMENTS

| 4,087,657 | A |   | 5/1978  | Peoples ............... 179/175.3 R |
|-----------|---|---|---------|---------|
| 5,121,420 | A |   | 6/1992  | Marr et al. .................... 379/26 |
| 5,128,619 | A |   | 7/1992  | Bjork et al. ................. 324/533 |
| 5,369,366 | A |   | 11/1994 | Piesinger .................... 324/533 |
| 5,440,528 | A |   | 8/1995  | Walsh ......................... 368/113 |
| 5,461,318 | A | * | 10/1995 | Borchert et al. ............. 324/532 |
| 5,521,512 | A |   | 5/1996  | Hulina ........................ 324/533 |
| 5,528,356 | A | * | 6/1996  | Harcourt ..................... 356/73.1 |
| 5,530,365 | A |   | 6/1996  | Lefeldt ....................... 324/536 |
| 5,530,367 | A |   | 6/1996  | Bottman ..................... 324/616 |
| 5,650,728 | A |   | 7/1997  | Rhein et al. ................. 324/543 |
| 5,731,869 | A |   | 3/1998  | Minami ..................... 356/73.1 |
| 5,881,130 | A |   | 3/1999  | Zhang ........................... 379/6 |
| 5,994,905 | A |   | 11/1999 | Franchville ................. 324/533 |
| 6,104,197 | A | * | 8/2000  | Kochan ....................... 324/533 |
| 6,195,614 | B1 | * | 2/2001  | Kochan ........................ 702/66 |
| 6,263,047 | B1 | * | 7/2001  | Randle et al. ................ 379/31 |
| 6,448,781 | B1 | * | 9/2002  | Frank et al. ................ 324/533 |

* cited by examiner

*Primary Examiner*—Curtis Kuntz
*Assistant Examiner*—Barry W Taylor
(74) *Attorney, Agent, or Firm*—Webb Ziesenheim Logsdon Orkin & Hanson, P.C.

(57) ABSTRACT

A delay-line time-domain reflectometer includes a return detector configured to process a discharge pulse produced by discharge of a line capacitor, formed by the physical relationship of a pair of conductive wires forming a telephone line, from a predetermined DC voltage. The return detector includes a number of neural networks configured to process the discharge pulse under the control of a controller. The neural networks enable the controller to characterize the loop configuration of the telephone line, where the loop configuration includes the length of the telephone line, the position of any bridged tap connected to the telephone line and/or the length of any bridged tap connected to the telephone line.

38 Claims, 12 Drawing Sheets

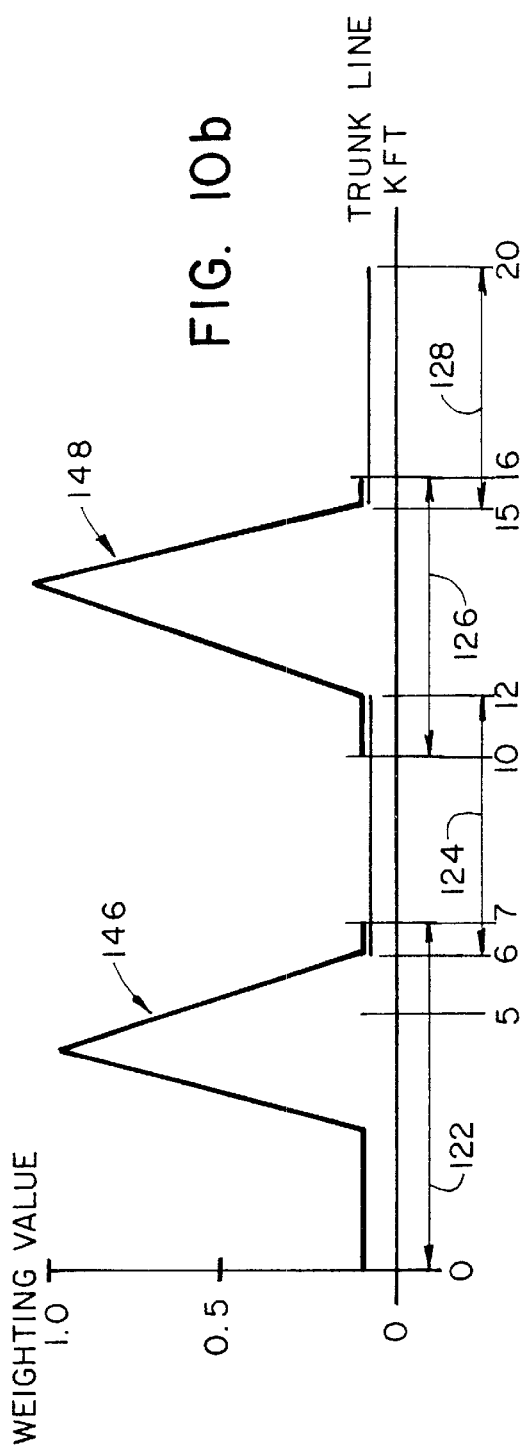
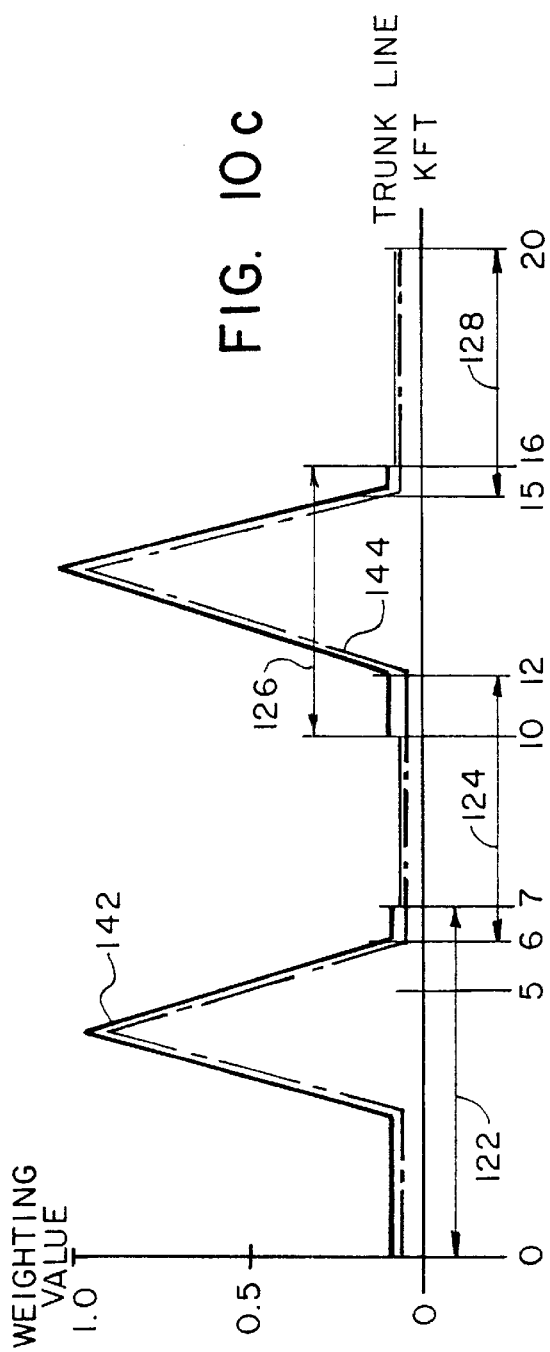

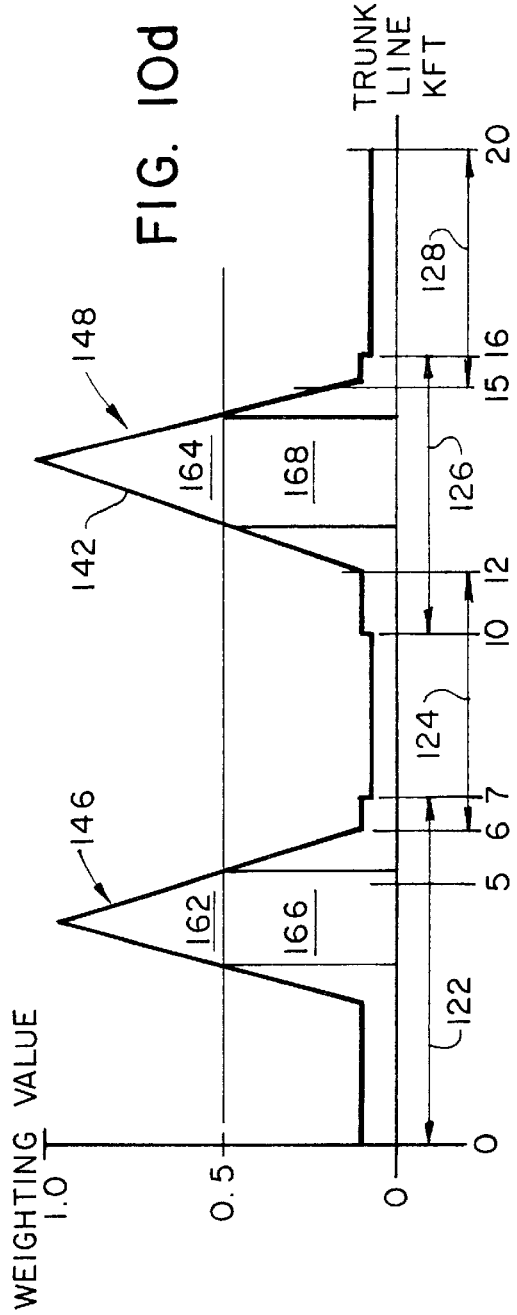
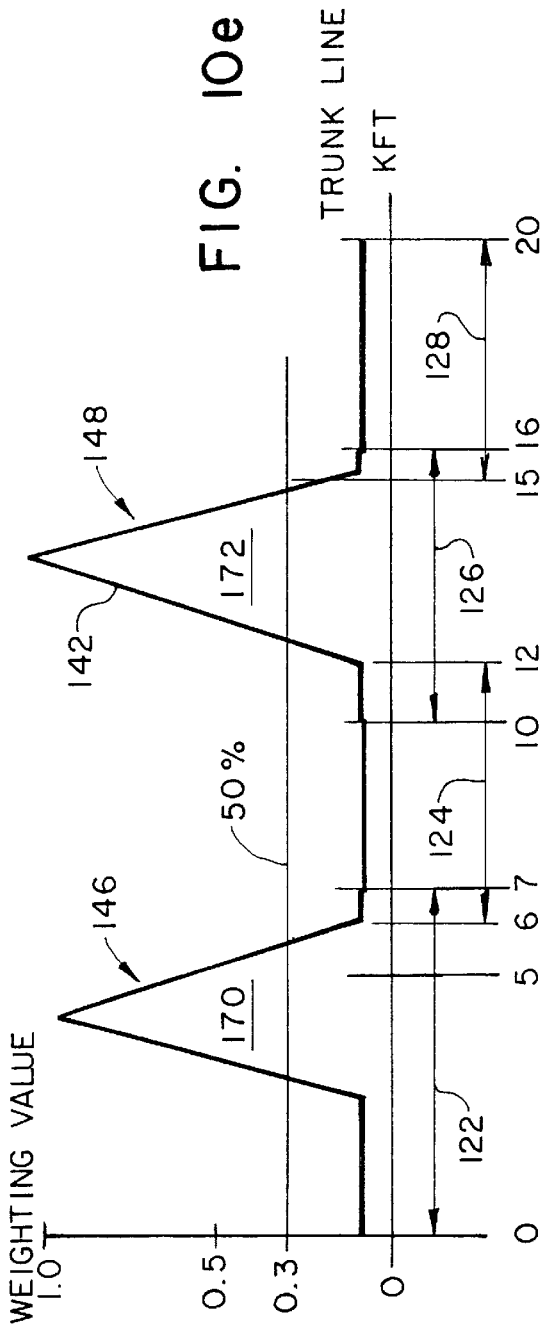

2

APPARATUS AND METHOD FOR DETECTING A BRIDGED TAP AND/OR AN END-OF-LINE OF A CONVENTIONAL TELEPHONE LINE USING DELAY-LINE TIME-DOMAIN REFLECTOMETRY

BACKGROUND OF THE INVENTION

1. Field of the Invention

This invention relates to testing of telephone lines using time-domain reflectometry.

2. Description of the Prior Art

A typical telephone subscriber receives telephony services over a pair of copper wires at frequencies below 4 kHz. Recent transmission technology, such as digital subscriber line (DSL), has expanded the possible use of copper wires to enable high speed data transmissions using frequencies up to and beyond 1 MHz. However, installation practices and defects or anomalies in copper wire pairs can limit or distort the transmission carrying capacity thereof. To test for possible problems in copper wire pairs, a single-ended test is desired to avoid or minimize the time and expense of dispatching repair personnel to the far end of a copper wire pair for a dual-ended test.

Time-domain reflectometry (TDR) is a well-known and generally available technique that can be utilized to identify problems associated with copper wire pairs. TDR apparatus and methods are disclosed generally in U.S. Pat. Nos. 5,121,420 to Marr et al.; 5,369,366 to Piesinger; 5,461,318 to Borchertetal.; 5,521,512 to Hulina; 5,530,365 to Lefeldt; and 5,650,728 to Rhein et al.

Traditional TDR techniques, however, have several limitations. Specifically, present TDR techniques include transmitting an electrical pulse down the copper wire pair and measuring the time to receive a return pulse. This return pulse occurs when the transmitted pulse encounters a change in impedance of the copper wire pair due to some discontinuity therein. Common causes of discontinuities in the copper wire pair include: splices where different copper wire pairs are joined together; moisture on or around the copper wire pair; connection of bridged taps to the copper wire pair; or terminations, such as telephones, that may be connected to the copper wire pair.

Conventional TDR is limited by the energy content of the pulse and the frequency dispersion of the pulse as it travels along the length of the copper wire pair and back. These limitations include: technical difficulty in coupling all of the source TDR energy pulses to the copper wire pair; very low return signal levels due to losses associated with round trip pulse transmission along the copper wire pair; "smearing" of return pulses due to multiple reflections in both directions of pulse travel, and a low signal-to-noise ratio (SNR) on a lossy copper wire pair.

It is, therefore, an object of the present invention to provide an apparatus and method for detecting a loop configuration of a telephone line. This loop configuration can include: the length of the telephone line; the position of a bridged tap connected to the telephone line; and/or the length of the bridged tap connected to the telephone line. Still other objects of the present invention will become apparent to those of ordinary skill in the art upon reading and understanding the following detailed description.

SUMMARY OF THE INVENTION

Accordingly, we have invented an apparatus for detecting discontinuities of a telephone line. The apparatus includes means for electrically stimulating a telephone line and a return detector for acquiring plural samples of data corresponding to the response of the telephone line to the electrical stimulation during at least one sample interval. A controller stores the plural samples of data and forms therefrom a plurality of windows of sampled data with each window including a unique subset of the plural samples of data. An activity finder receives each of the plurality of windows and outputs a weighting value for each window as a function of at least one of (i) the numerical values of the unique subset of the plural samples of data of the window; (ii) the relative position of the window in the plurality of windows; and (iii) the numerical range of values of the unique subsets of the plural samples of data forming the window. The controller can detect a predetermined event from a subset of the weighting values and can select one of the plurality of windows as a function of one of the weighting values of the subset of weighting values. An event identifier processes the one window and outputs to the controller as a function thereof a first value which is a numerical probability that the one window represents a discontinuity of the telephone line. The event identifier can also output as a function of the one window a second value which is a numerical probability that the one window represents an end-of-line (EOL) of the telephone line.

Preferably, the first value is a bridged tap (BT) value which relates to a position on the telephone line where a BT is connected. The first value can also relate to a position on the telephone line where a load coil is connected; a position on the telephone line where there is a change in the wire gauge of the wire forming the telephone line; and/or a position on the telephone line where there are faults or partially broken leads in the wire forming the telephone line. Preferably, the second value, also known as an EOL value, relates to the EOL of the telephone line. When the first value is a BT value, a BT length identifier processes the one window when the BT value is greater than the EOL value and outputs to the controller as a function of the BT value a BT length value. An EOL locator processes the one window and at least two of the BT value, the EOL value, the BT length value, the one weighting value of the subset of weighting values, the range of numerical values of the unique subset of the plural samples of data, and the relative location of the one window in the plurality of windows and outputs to the controller as a function thereof an EOL length value. When the BT value is greater than the EOL value, the relative position of the one window in the plurality of windows corresponds to a position on the telephone line where the BT is connected. When the EOL value is greater than the BT value, the relative position of the one window in the plurality of windows corresponds to a length of the telephone line.

The electrical stimulation can include a first pulse corresponding to a first section of the telephone line and a second pulse corresponding to a second section of the telephone line which is partially coincident with the first section of the telephone line. The response of the telephone line includes a first waveform corresponding to a response of the telephone line to the first pulse and a second waveform corresponding to a response of the telephone line to the second pulse. A part of the first waveform and a part of the second waveform represent the response of the telephone line where the first section of the telephone line is partially coincident with the second section of the telephone line.

A first subset of the plurality of windows can be associated with the part of the first waveform and a second subset of the plurality of windows can be associated with the part of the second waveform. The activity finder can determine for each window of the first subset of the plurality of windows a first weighting value associated with the first waveform and can determine for each window of the second subset of the plurality of windows a second weighting value associated with the second waveform. Each first weighting value forms with one of the second weighting values a pair of weighting values having their respective windows including samples of data related to the same section of the telephone line.

A BT counter can be included for receiving the weighting values of the plurality of windows and for forming from the received weighting values a first trace which includes weighting values associated with the first waveform and weighting values associated with the second waveform and which excludes for each pair of related first and second weighting values the minimum thereof. The BT counter also forms from the received weighting values a second trace which includes weighting values associated with the first waveform and weighting values associated with the second waveform and which excludes for each pair of related first and second weighting values the maximum thereof. The BT counter processes the first trace and the second trace to obtain a count of bridged taps connected to the telephone line.

This processing of the first trace and second trace by the BT counter can include determining for each of a plurality of predetermined threshold weighting values two or more of (i) a first value corresponding to an area of the first trace which is greater than the predetermined threshold weighting value; (ii) a second value corresponding to an area of the second trace which is greater than the predetermined threshold weighting value; (iii) a third value corresponding to a total area of the first trace which is associated with the area thereof which is greater than the predetermined threshold weighting value; and (iv) a fourth value corresponding to a total area of the second trace which is associated with the area thereof which is greater than the predetermined threshold weighting value. Processing of the first trace and the second trace can also include determining for each of a plurality of percentages at least one of (i) a first weighting value where a ratio of an area of the first trace above the first weighting value to the total area of the first trace equals the percentage and (ii) a second weighting value where a ratio of the area of the second trace above the second weighting value to the total area of the second trace equals the percentage. From two or more of the first through fourth values and at least one of the first and second weighting values at least one BT count value corresponding to the number of bridged taps connected to the telephone line can be determined.

The BT counter can also receive for each window the numerical range of values of the samples of data thereof, i.e., a difference between the largest numerical value of the window and the smallest numerical value of the window. Based on the temporal positions of the corresponding windows of sampled data, the BT counter arranges the largest range values into a third trace which excludes the smallest range value of each pair of ranges of values associated with the same section of telephone line and arranges the smallest range values into a fourth trace which excludes the largest range value of each pair of ranges of values associated with the same section of telephone line. For a plurality of predetermined threshold numerical values, the BT counter determines areas of the third trace and the fourth trace above each predetermined threshold numerical value. From the areas above each predetermined threshold numerical value, the BT counter determines at least one BT count value corresponding to the number of BTs connected to the telephone line.

The functions performed by one or more of the activity finder, the event finder, the BT length finder, the EOL finder and/or the BT counter can be implemented in one or more trained neural networks.

Preferably, the samples of data forming each window of sampled data are preferably decimated by N prior to the activity finder receiving each window. In one embodiment, N equals six (N=6).

The means for electrically stimulating the telephone line can include a charge generator for charging the telephone line to at least one predetermined voltage and a line clamp for connecting together two or more conductive wires which form the telephone line.

We have also invented an apparatus for detecting a discontinuity of a telephone line. The apparatus includes means for electrically stimulating a telephone line and a return detector for detecting during a sample interval a response waveform produced by the telephone line in response to the electrical stimulation. A controller stores the response waveform and forms therefrom a plurality of windows, with each window corresponding to a unique part of the response waveform. An activity finder determines a weighting value for each window as a function of at least two of (i) changes in the response waveform occurring in the window; (ii) the temporal position of the window in the plurality of windows; and (iii) the range of the response waveform in the window. The controller can detect a predetermined event in a subset of the weighting values and can select one of the plurality of windows as a function of one of the weighting values of the subset of weighting values. Preferably, the one window is selected based on its corresponding weighting value being the central weighting value in the subset of weighting values. An event identifier processes the one window to produce a first value which is a numerical probability that the one window represents a discontinuity of the telephone line. The event identifier can also output as a function of the one window a second value which is a numerical probability that the one window represents an EOL of the telephone line. Preferably, the first and second values are a BT value and an EOL value.

A BT length identifier processes the one window when the BT value is greater than the EOL value to produce a BT length value. An EOL locator determines an EOL length value as a function of at least two of the BT value, the EOL value, the BT length value, the one weighting value of the subset of weighting values, the range of the response waveform in the one window, and the relative position of the one window in the plurality of windows. When the BT value is greater than the EOL value, the BT length value corresponds to the length of a bridged tap connected to the telephone line and the temporal position of the one window in the plurality of windows corresponds to a position on the telephone line where the bridged tap is connected. When the EOL value is greater than the BT value, the temporal position of the one window in the plurality of windows corresponds to a length of the telephone line.

Lastly, we have invented a method of testing a telephone line. The method includes electrically stimulating a telephone line and detecting during a sample interval a response waveform produced by the telephone line in response to the electrical stimulation. The response waveform is stored and a plurality of windows is formed therefrom, with each window corresponding to a unique part of the response waveform. A weighting value is determined for each window as a function of at least two of (i) changes in the response waveform occurring in the window; (ii) the temporal location of the window in the sample interval; and (iii) the range of the response waveform in the window. A predetermined event is detected in a subset of the weighting values and one of the plurality of windows is selected as a function of one of the weighting values of the subset of weighting values. The one window is processed to produce a first value which is a numerical probability that the one window represents a discontinuity of the telephone line. The one window can also be processed to produce at least one of a second value and a third value, where the second value is a numerical probability that the one window represents an EOL of the telephone line. Preferably, the first, second and third values are a BT value, an EOL value and a BT length value, respectively.

An EOL length value can be determined as a function of at least two of the BT value; the EOL value; the BT length value; the one weighting value of the subset of weighting values; the range of the response waveform in the one window; and the temporal location of the one window in the sample interval. When the BT value is greater than the EOL value, the BT length value corresponds to the length of a bridged tap connected to the telephone line and the temporal location of the one window in the sample interval corresponds to the position of the bridged tap on the telephone line. When the EOL value is greater than the BT value, the temporal location of the one window in the sample interval corresponds to a length of the telephone line.

The response waveform can include a first waveform corresponding to a response of the first part of the telephone line and a second waveform corresponding to a response of a second part of the telephone line. A part of the first waveform and a part of the second waveform correspond to the response of the telephone line where the first part of the telephone line is partially coincident with the second part of the telephone line.

The part of the first waveform and the part of the second waveform each have one or more windows associated therewith. Each window of the part of the first waveform is related to one window of the part of the second waveform based upon their respective waveforms being related to a common section of the telephone line.

For each window of the first waveform, a first weighting value is determined and for each window of the second waveform a second weighting value is determined. The weighting values are utilized to form a first trace which includes weighting values related to the first waveform and weighting values related to the second waveform, which excludes for each related pair of first and second weighting values the minimum thereof. Also formed from the weighting values is a second trace which includes weighting values related to the first waveform and weighting values related to the second waveform, which excludes for each related pair of first and second weighting values the maximum thereof. The first trace and the second trace can be processed to obtain a count of bridged taps connected to the telephone line.

The numerical range of the samples of data forming the response waveform in each window can be determined and, based on the temporal positions of each window of the plurality of windows, the maximum range values can be arranged into a third trace which excludes the minimum range value of each pair of ranges of values associated with the same section of the telephone line, and the minimum range values can be arranged into a fourth trace which excludes the maximum range of each pair of ranges of values associated with the same section of the telephone line. A plurality of predetermined threshold numerical values can be provided and areas of the third trace and the fourth trace can be determined above each predetermined threshold numerical value. As a function of the areas of the third and fourth traces above each of the predetermined numerical threshold values, the number of BTs connected to the telephone line can be determined.

BRIEF DESCRIPTION OF THE DRAWINGS

FIGS. 10b and 10c are graphs of weighting value vs. length of the trunk line of FIG. 1;

FIG. 10d is a graph of weighting value vs. length of the trunk line of FIG. 1 including a predetermined threshold weighting value;

FIG. 10e is a graph of weighting value vs. length of the trunk line of FIG. 1 including a predetermined percentage weighting value.

DETAILED DESCRIPTION OF THE PREFERRED EMBODIMENT

Figure 1:
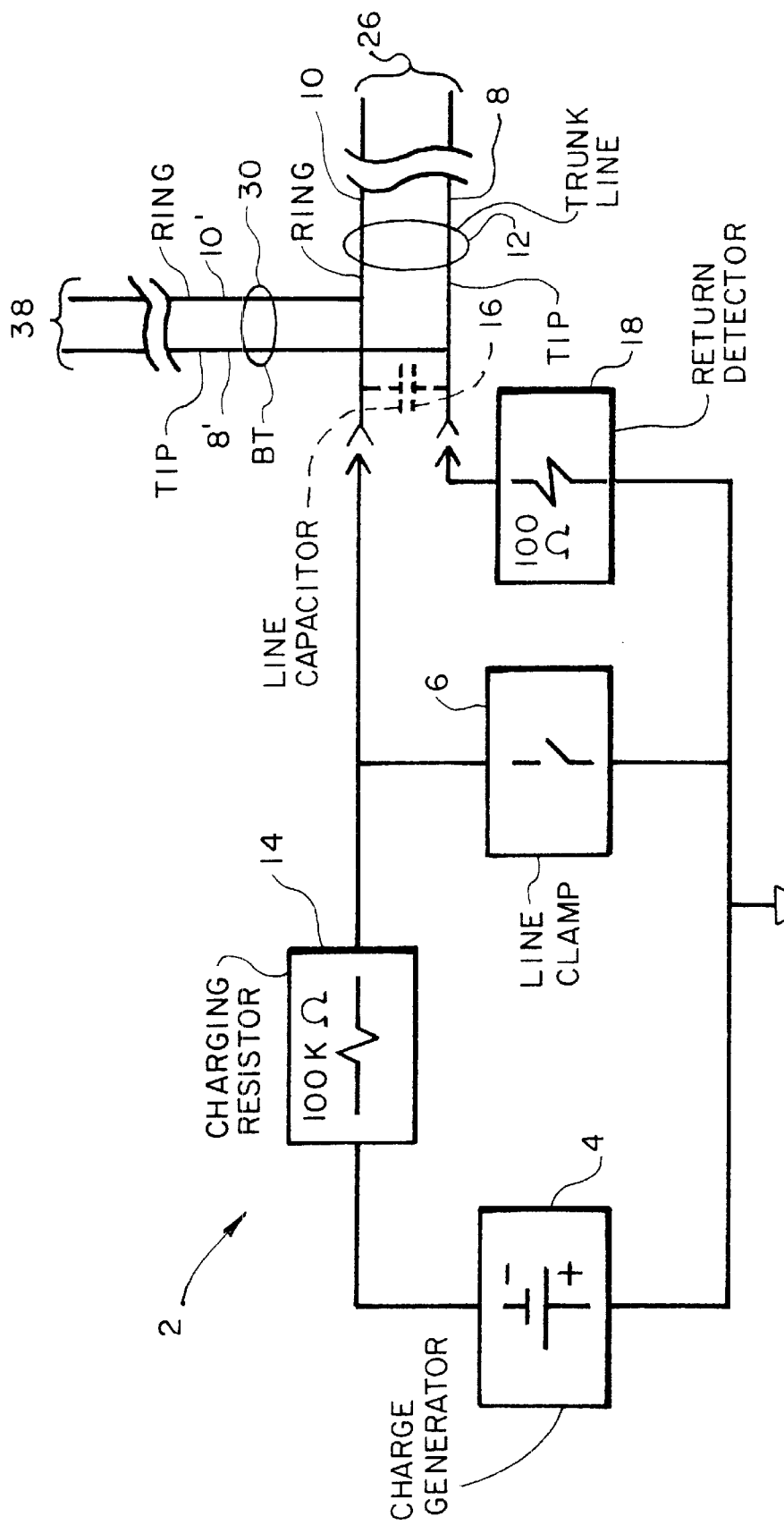
FIG. 1 is a generalized schematic drawing of a delay-line time-domain reflectometer (DLTDR) in accordance with the present invention connected to a trunk line having a pair of wires.

The present invention will be described with reference to the accompanying drawings, wherein like reference numerals correspond to like elements.

With reference to FIG. 1, a delay-line time-domain reflectometer (DLTDR) 2 in accordance with the present invention essentially includes a charge generator 4 and a line clamp 6 connected in parallel between a TIP lead 8 and a RING lead 10 of a telephone line 12, hereinafter referred to as a "trunk line". It is well-known in the art that a conventional telephone line, such as trunk line 12, has a capacitance and/or resistance per unit length that is controlled during manufacture of the telephone line to ensure compatibility with existing telephony equipment to be connected thereto.

A charging resistor 14, preferably having a value of 100 K ohm, is connected between the charge generator 4 and TIP lead 8 or RING lead 10 of trunk line 12 to limit the charging current that is utilized to charge a line capacitor 16 formed by the physical relation of TIP lead 8 and RING lead 10 of trunk line 12. For the purpose of illustration, line capacitor 16 formed by TIP lead 8 and RING lead 10 of trunk line 12 is shown in phantom in FIG. 1. A return detector 18, preferably having a 100 ohm input resistance, is connected between line clamp 6 and the other of TIP lead 8 or RING lead 10 of trunk line 12. Return detector 18 detects the response of trunk line 12 in a manner to be described hereinafter in greater detail.

In operation, charge generator 4 charges line capacitor 16 to a desired DC voltage through charging resistor 14. Preferably, TIP lead 8 is connected to an isolated ground 20 via return detector 18, and RING lead 10 is charged to a negative voltage relative to the potential of TIP lead 8. However, this is not to be construed as limiting the invention.

Figure 2:
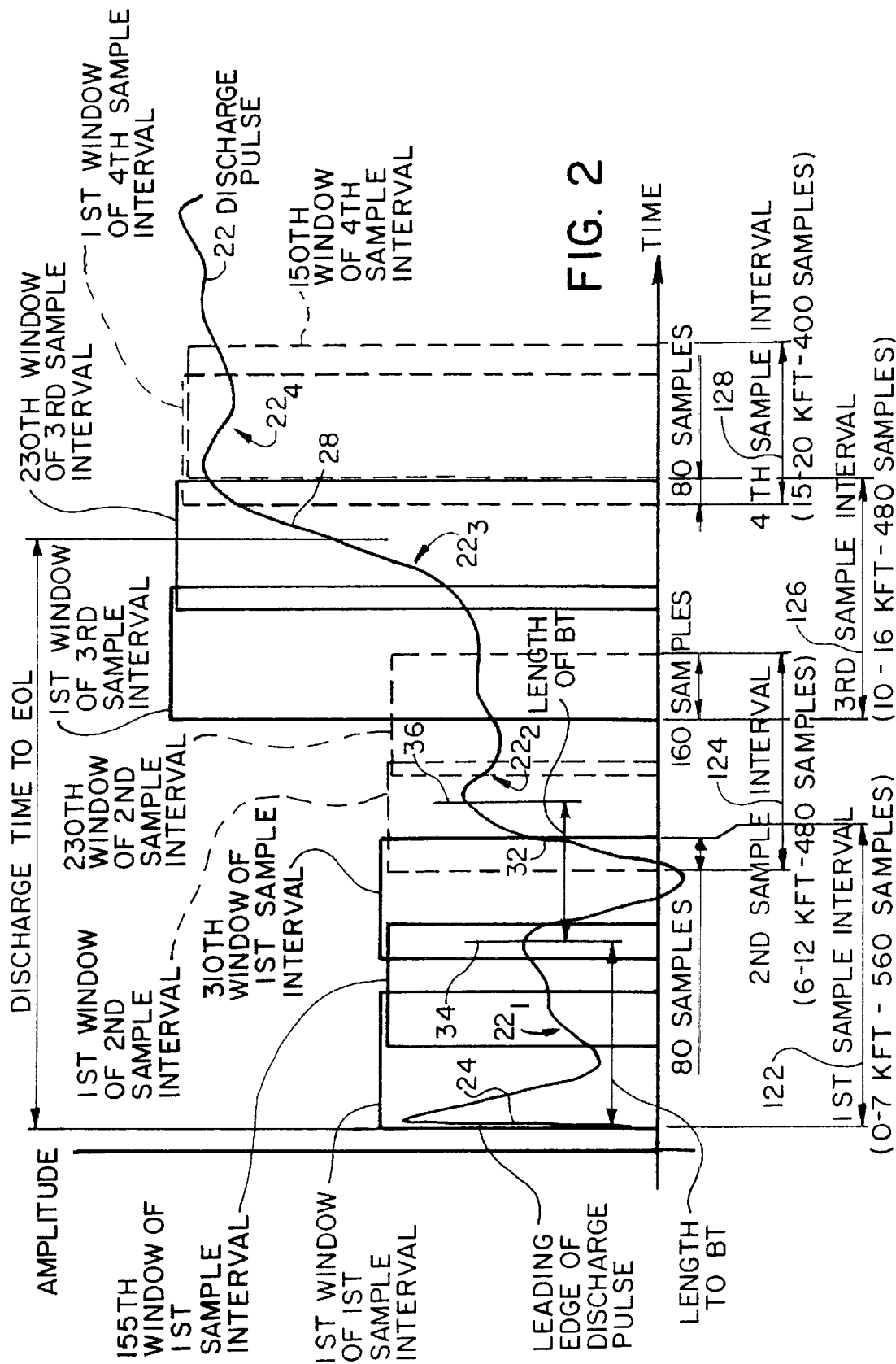
FIG. 2 is a graph of amplitude vs. time of a discharge pulse generated by discharge of a line capacitor formed by the pair of wires in response to operation of the DLTDR in FIG. 1.

With reference to FIG. 2, and with continuing reference to FIG. 1, when line capacitor 16 is charged to a desired DC voltage, line clamp 6 connects TIP lead 8 and RING lead 10 together thereby causing line capacitor 16 to discharge through the 100 ohm input resistance of return detector 18. This discharge generates across return detector 18 a discharge pulse 22 having a leading edge 24 and an amplitude that essentially changes exponentially to the potential of isolated ground 20 due to the discharge of the charge stored in line capacitor 16.

Interaction between discharge pulse 22 and a terminal end 26 of trunk line 12 opposite DLTDR 2 generates an end-of-line (EOL) pulse 28 that is superimposed on discharge pulse 22. The interval between leading edge 24 of discharge pulse 22 and EOL pulse 28 corresponds to a distance between DLTDR 2 and terminal end 26 of trunk line 12. It has been empirically determined that the duration between leading edge 24 of discharge pulse 22 and EOL pulse 28 corresponds to two times the distance between DLTDR 2 and terminal end 26 of trunk line 12. Stated differently, the duration between leading edge 24 of discharge pulse 22 and EOL pulse 28 corresponds to two times the transmission delay of trunk line 12.

Since EOL pulse 28 propagates along trunk line 12, the amplitude of EOL pulse 28 sensed by return detector 18 is reduced due to interaction of EOL pulse 28 with the resistance of the conductor(s) forming TIP lead 8 and/or RING lead 10 of trunk line 12. More specifically, the amplitude of EOL pulse 28 is inversely proportional to the length of trunk line 12. Hence, EOL pulse 28 has a greater amplitude for a short trunk line and a lesser amplitude for a long trunk line. For very long trunk lines, e.g., 18,000 feet, it has been empirically determined that the amplitude of EOL pulse 28 sensed by return detector 18 can be as low as 1 millivolt (mV).

As shown in FIG. 1, TIP lead 8' and RING lead 10' of one or more telephone lines 30 can be bridge connected to TIP lead 8 and RING lead 10 of trunk line 12. Each telephone line 30 bridge connected to trunk line 12 is hereinafter referred to as a "bridged tap" (BT) 30. In response to discharge pulse 22, any BT 30 connected to trunk line 12 will generate a BT pulse 32 superimposed on discharge pulse 22 at a time corresponding to the position of BT 30 on trunk line 12. More specifically, the interval detected by return detector 18 between leading edge 24 of discharge pulse 22 and a leading edge 34 of BT pulse 32 corresponds to the distance between DLTDR 2 and the corresponding BT 30. Moreover, the interval detected by return detector 18 between leading edge 34 and a trailing edge 36 of the same BT pulse 32 corresponds to the distance between trunk line 12 and a terminal end 38 of BT 30.

Discharge pulse 22 decays at a substantially lower frequency than the frequencies associated with leading edge 24 of discharge pulse 22, EOL pulse 28 and/or BT pulse 32. In order to avoid detecting the frequency associated with the decay of discharge pulse 22, return detector 18 is preferably configured to reject frequencies associated therewith and to detect frequencies associated with leading edge 24 of discharge pulse 22, EOL pulse 28 and/or BT pulse 32.

Charge generator 4 is configured to vary the voltage to which line capacitor 16 is charged to optimize the amplitude of EOL pulse 28 and/or BT pulse 32 for detection by return detector 18. Specifically, line capacitor 16 formed by a short trunk line 12 can be charged to a lower voltage than a line capacitor 16 for a long trunk line 12 for a given amplitude of EOL pulse 28 and/or BT pulse 32.

Figure 3:
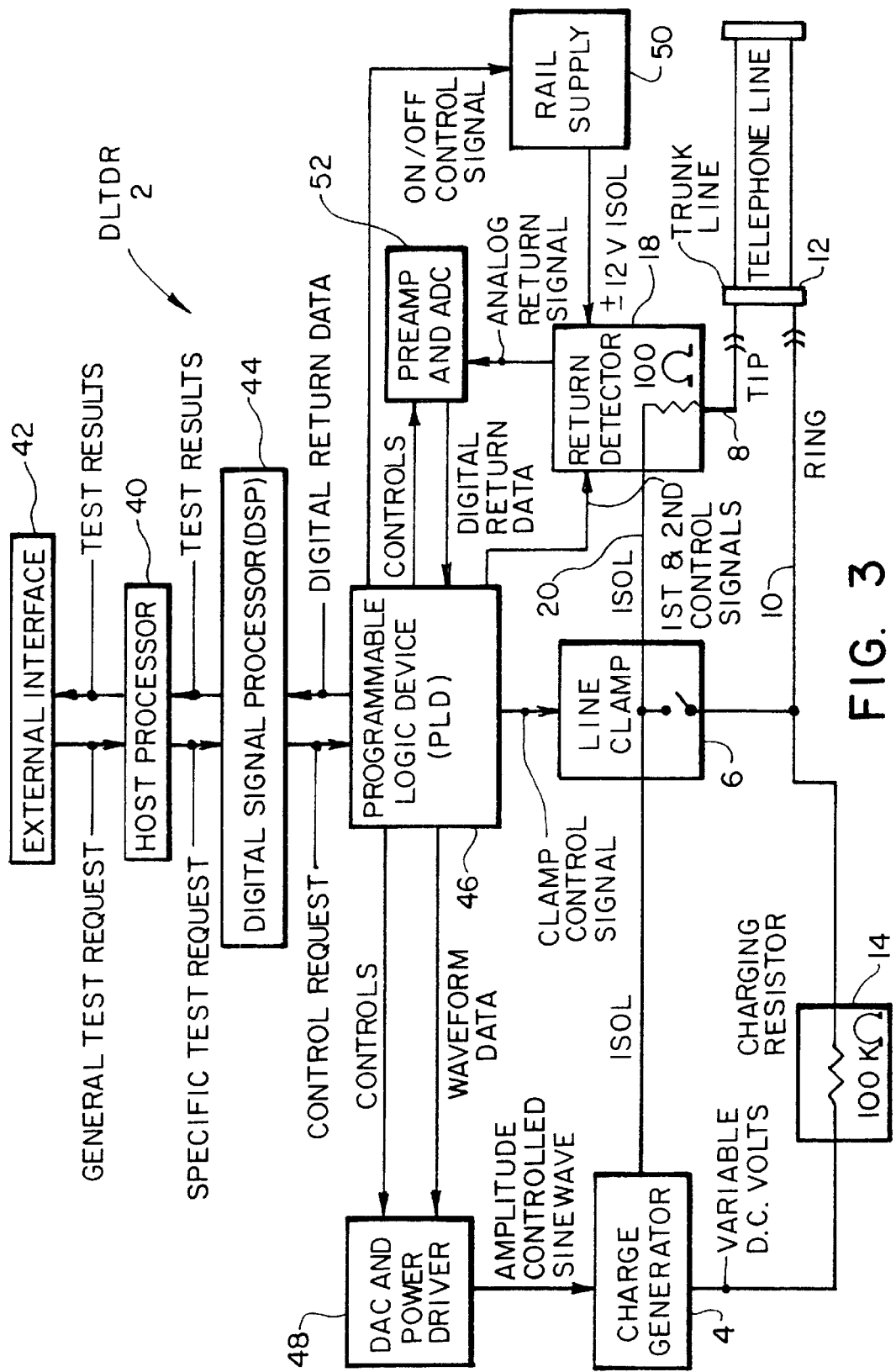
FIG. 3 is a detailed schematic drawing of the DLTDR in FIG. 1.

With reference to FIG. 3, and with continuing reference to FIGS. 1 and 2, DLTDR 2 includes a host processor 40 which communicates with an external controller (not shown) via an external interface 42 which is configured to support communication between the external controller and host processor 40. A digital signal processor (DSP) 44 is connected to host processor 40. DSP 44 is configured to implement a test of trunk line 12 in response to receiving a test request from host processor 40 and to return test results to host processor 40. When the test of trunk line 12 is complete, host processor 40 receives results of the test from DSP 44 and communicates the test results to the external controller via external interface 42. A typical test includes detecting the location of BT 30 on trunk line 12, detecting the length of trunk line 12 and/or detecting the length of BT 30.

Preferably, host processor 40 is a microprocessor that is programmed to control the overall operation of DLTDR 2, such as coordinating the operation of DSP 44, and to perform time intensive routines required for external communication via external interface 42. DSP 44 preferably manages high level tasks associated with operation of DLTDR 2. These high level tasks include issuing hardware control requests to a programmable logic device (PLD) 46 and processing of digital return data from PLD 46 to identify the location of BT 30 on trunk line 12, the length of trunk line 12 and/or the length of BT 30 connected thereto.

The processing of digital return data preferably includes pattern matching of leading edge 24 of discharge pulse 22, EOL pulse 28 and/or BT pulse 32 based upon digital return data gathered from discharge pulses 22 obtained from test trunk lines (not shown) having known lengths and test BTs (not shown) having known lengths that are connected to the test trunk lines at known locations. This pattern matching enables DSP 44 to determine the length of trunk line 12, the location of BTs 30 connected to trunk line 12 and the length of BTs 30 connected to trunk line 12 by matching the digital return data acquired from discharge pulses 22 obtained from trunk line 12 and/or BTs 30 having unknown characteristics with digital return data gathered from discharge pulses 22 acquired from test trunk lines and/or test BTs having known characteristics.

PLD 46 accepts control requests from DSP 44 and manages the operation of hardware that performs low-level signal generation and conversion. This hardware includes a DAC/PWR driver 48, charge generator 4, line clamp 6, return detector 18, a rail supply 50 and a PREAMP/ADC 52. Essentially, PLD 46 is an interface between DSP 44 and this hardware.

Under the control of PLD 46, DAC/PWR driver 48 preferably generates a 1 MHz sine wave for charging line capacitor 16. PLD 46 controls the amplitude of the sine wave produced by DAC/PWR driver 48 to control the voltage to which line capacitor 16 is charged.

Figure 4:
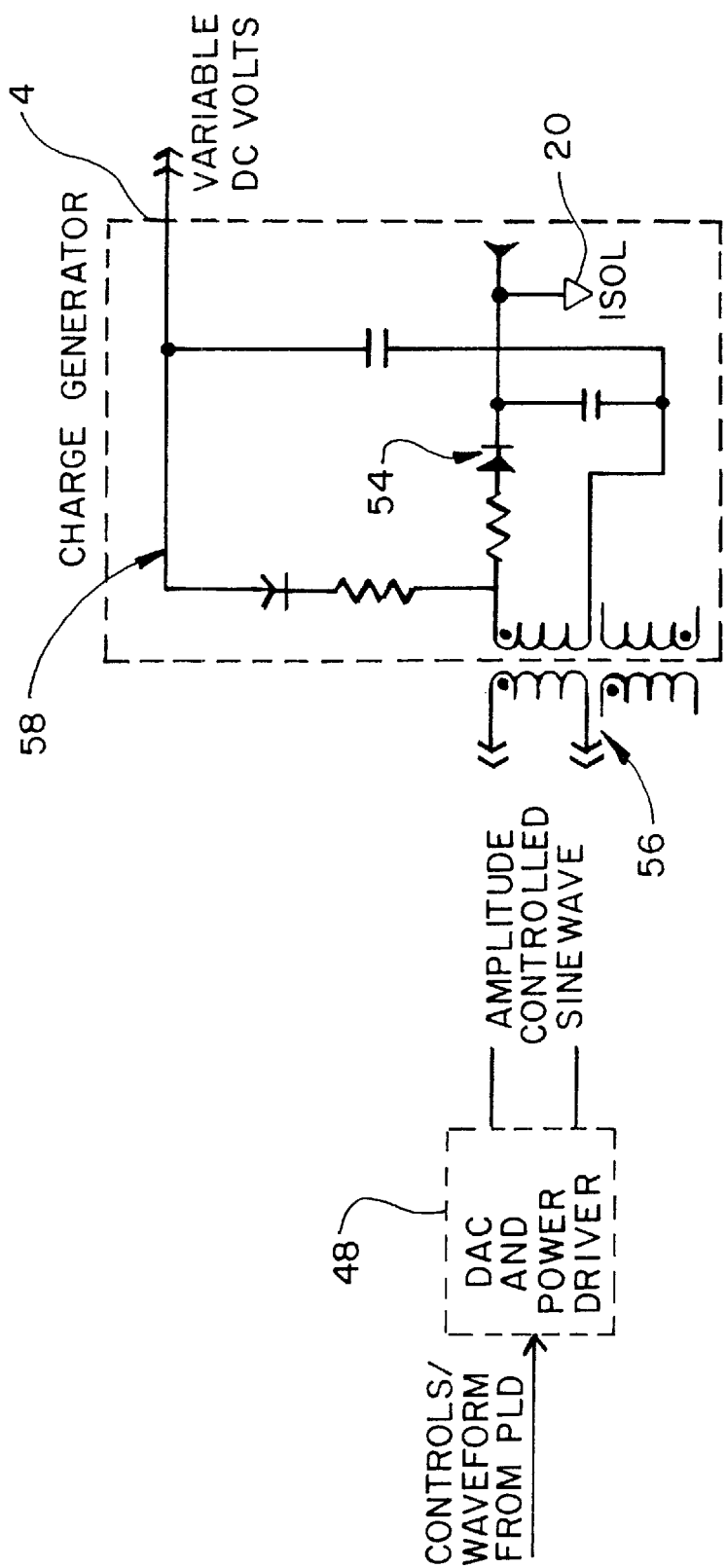
FIG. 4 is a detailed electrical schematic of the charge generator of FIG. 3 connected to receive an amplitude controlled sine wave from the DAC and power driver of FIG. 3.

With reference to FIG. 4, and with continuing reference to FIGS. 1–3, charge generator 4 includes a rectifier 54 which rectifies the sine wave produced by DAC/PWR driver 48 to produce a DC voltage for charging line capacitor 16. Charge generator 4 also includes a step-up transformer 56 which isolates line capacitor 16 from earth ground and a voltage doubler 58.

Charging resistor 14 preferably has a value of 100 K ohm for limiting current to line capacitor 16 during charging and operation of line clamp 6. The resistance of charging resistor 14 essentially isolates charge generator 4 from line capacitor 16 when line clamp 6 connects together TIP lead 8 and RING lead 10 of trunk line 12.

Charge generator 4 applies to line capacitor 16, preferably RING lead 10, a selected voltage based on the length and/or section of trunk line 12 to be tested. Examples of typical voltages for corresponding lengths and/or sections of trunk line 12 include:

| Voltage | Length of Trunk Line (1000 feet) |
| --- | --- |
| 13.2 V | 0 to 7 |
| 54.2 V | 6 to 12 |
| 138 V | 10 to 20 |

Once line capacitor 16 is charged to a desired level by charge generator 4, PLD 46 supplies a clamp control signal to line clamp 6. In response to receiving the clamp control signal, line clamp 6 connects TIP lead 8 and RING lead 10 of trunk line 12 together through return detector 18. Connecting TIP lead 8 and RING lead 10 of trunk line 12 together initiates discharge pulse 22 having superimposed thereon leading edge 24, EOL pulse 28 and, if trunk line 12 has BT 30 connected thereto, BT pulse 32. PLD 46 maintains the clamp control signal to line clamp 6 until EOL pulse 28 and/or BT pulse 32 are received by return detector 18. Thereafter, PLD 46 removes the clamp control signal thereby causing line clamp 6 to isolate TIP lead 8 and RING lead 10.

Figure 5:
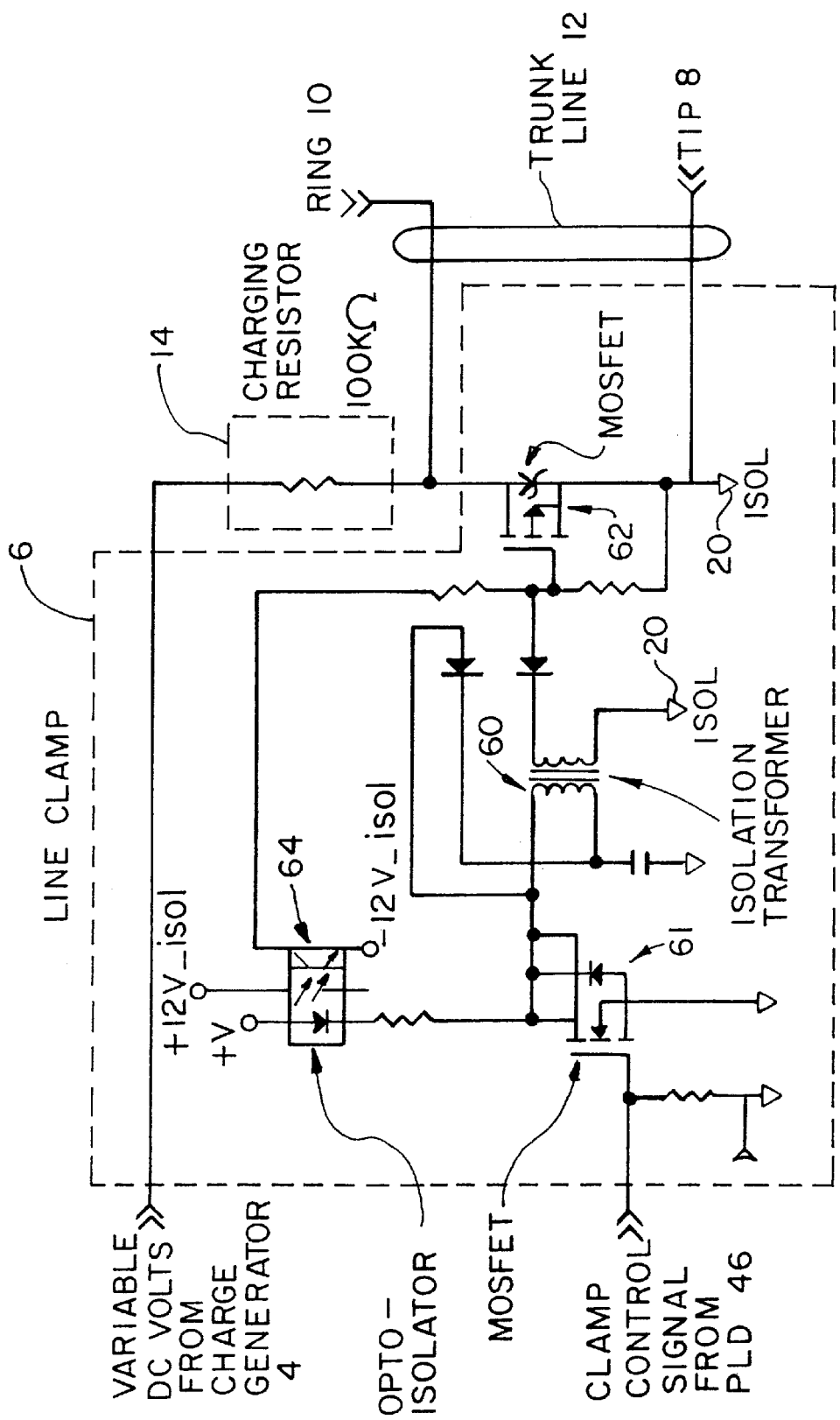
FIG. 5 is a detailed electrical schematic of the line clamp of FIG. 3.

With reference to FIG. 5, and with continuing reference to FIGS. 1–3, line clamp 6 includes an isolation transformer 60 which DC isolates line clamp 6 and return detector 18 from PLD 46, DSP 44 and host processor 40. Isolation transformer 60 enables line clamp 6 and return detector 18 to "float" electrically relative to PLD 46, DSP 44 and host processor 40, and avoids line clamp 6 and return detector 18 from being affected by common mode voltages, such as 60 Hz, induced from power lines or AM radio signals.

In response to receiving a leading edge of the clamp control signal from PLD 46 via a MOSFET 61, isolation transformer 60 supplies a rapid turn-on pulse to a MOSFET 62 in series with charging resistor 14. Preferably, isolation transformer 60 produces this rapid turn-on pulse within 25 nanoseconds (nsec) of receiving the clamp control signal. In response to receiving the turn-on pulse, MOSFET 62 connects together TIP lead 8 and RING lead 10 of trunk line 12.

Line clamp 6 also includes an opto-isolator 64 which is responsive to the clamp control signal. In response to MOSFET 61 receiving the clamp control signal having a sufficient DC level to cause a trigger thereof, opto-isolator 64 supplies to MOSFET 62 in series with charging resistor 14 a DC turn-on signal. Opto-isolator 64 has a slower response to the clamp control signal than isolation transformer 60. However, opto-isolator 64 is configured so that MOSFET 62 receives the DC turn-on signal before the turn-on pulse from isolation transformer 60 decays. Hence, the turn-on pulse from isolation transformer 60 initiates MOSFET 62 connecting together TIP lead 8 and RING lead 10 and the DC turn-on signal from opto-isolator 64 maintains MOSFET 62 in conduction thereby maintaining TIP lead 8 and RING lead 10 connected together during acquisition of leading edge 24 of discharge pulse 22, EOL pulse 28 and/or BT pulse 32.

Figure 6:
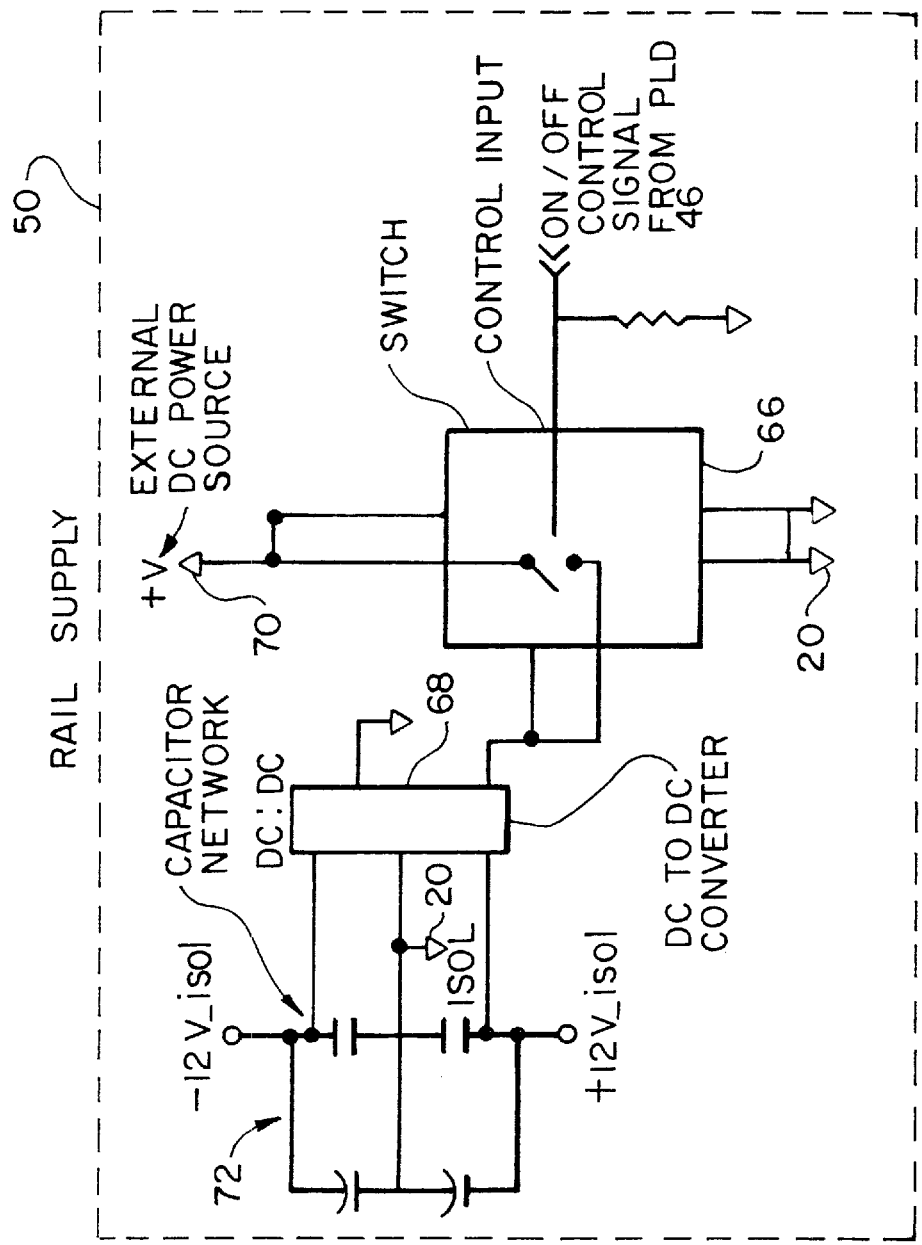
FIG. 6 is a detailed electrical schematic of the rail supply of FIG. 3.

With reference to FIG. 6, and with continuing reference to FIGS. 1–3, rail supply 50 includes a switch 66 having a control input connected to receive an ON/OFF control signal from PLD 46, a DC-to-DC converter 68 connectable to a source of external DC power 70 via switch 66 and a network of capacitors 72 connected to DC-to-DC converter 68. Absent receiving the ON/OFF control signal from PLD 46, switch 66 of rail supply 50 connects DC-to-DC converter 68 to the source of external DC power 70. DC-to-DC converter 68 charges the capacitor network 72 to ±12 volts relative to isolated ground 20. The ±12 volts and isolated ground 20 are utilized to supply power to return detector 18, shown in greater detail in FIG. 7.

In operation, PLD 46 supplies the ON/OFF control signal to switch 66 of rail supply 50 just before supplying the clamp control signal to line clamp 6. In response to receiving the ON/OFF control signal, switch 66 of rail supply 50 isolates DC-to-DC converter 68 from the source of external DC power 70. When DC-to-DC converter 68 is isolated from the source of external DC power 70, return detector 18 derives its operating power from capacitor network 72 of rail supply 50. Capacitor network 72 of rail supply 50 is configured to supply operating DC power to return detector 18 during acquisition of leading edge 24 of discharge pulse 22, EOL pulse 28 and/or BT pulse 32. DC-to-DC converter 68 is isolated from the source of external DC power 70 to avoid electrical noise from the source of external DC power 70 from affecting the operation of return detector 18.

Figure 7:
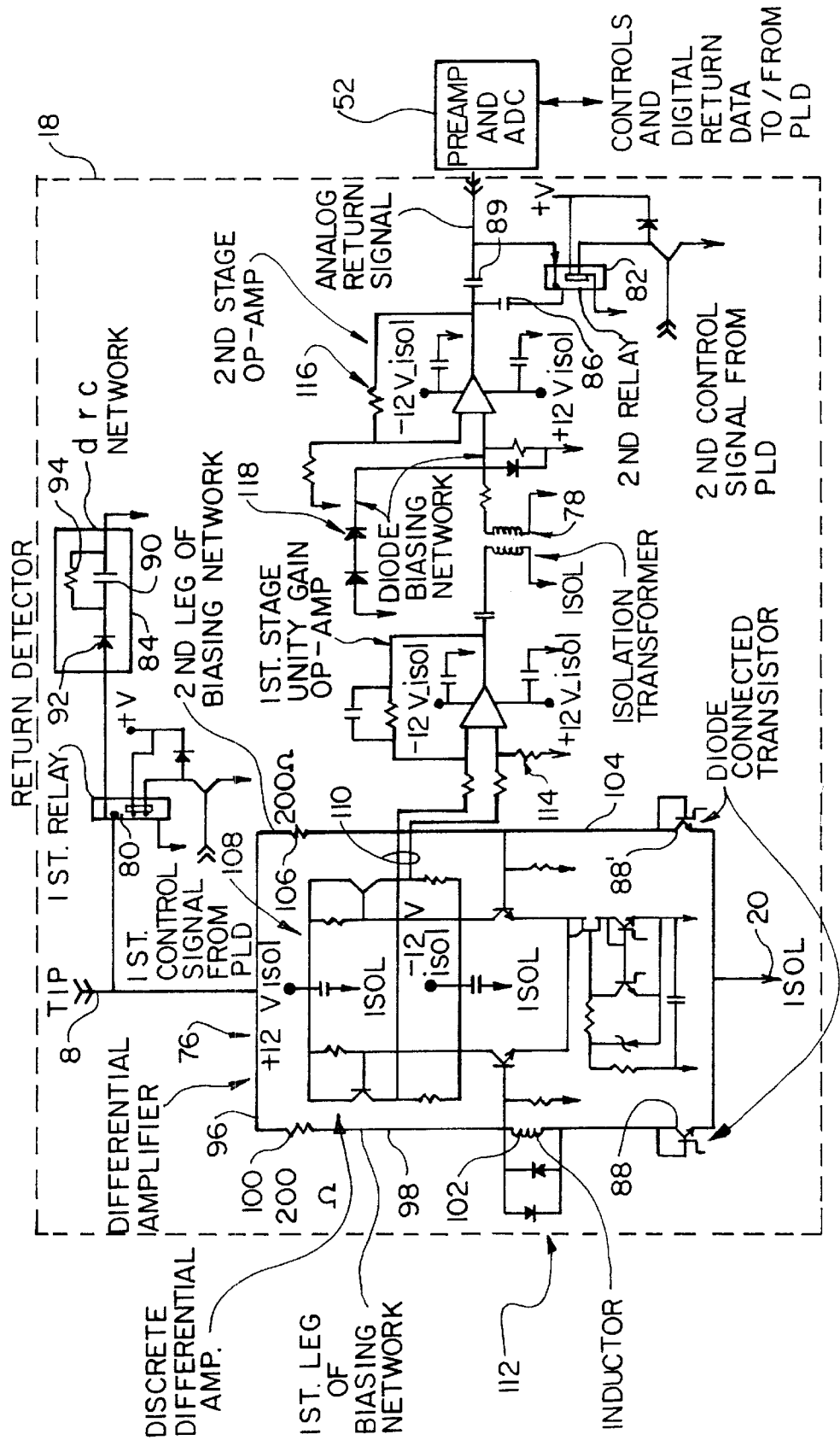
FIG. 7 is a detailed electrical schematic of the return detector of FIG. 3.

With reference to FIG. 7, and with continuing reference to FIGS. 1–3, return detector 18 provides a 100 ohm characteristic telephone line impedance to trunk line 12 and provides signal processing for detecting leading edge 24 of discharge pulse 22, EOL pulse 28 and/or BT pulse 32. Return detector 18 utilizes a differential amplifier 76 for detecting leading edge 24 of discharge pulse 22, EOL pulse 28 and/or BT pulse 32 superimposed on discharge pulse 22. Return detector 18 also provides an analog return signal to PREAMP/ADC 52 via an isolation transformer 78.

More specifically, return detector 18 includes a first relay 80 and a second relay 82 connected to receive a respective first control signal and a second control signal from PLD 46. First relay 80 connects a DRC network 84 to TIP lead 8 in response to receiving the first control signal. Second relay 82 connects a capacitor 86 to an input of PREAMP/ADC 52 in response to receiving the second control signal. DRC network 84 is connectable to TIP lead 8, and capacitor 86 is connectable to the input of PREAMP/ADC 52 to adapt the overall response of return detector 18 as a function of the voltage applied to line capacitor 16. Specifically, first relay 80 selectively connects the DRC network 84 to TIP lead 8 to limit peak current through diode-connected transistors 88 and 88' of differential amplifier 76. Second relay 82 selectively connects capacitor 86 in parallel with a capacitor 89 to form with the input/output resistance of PREAMP/ADC 52 a filter network responsive to the analog return signal received from differential amplifier 76.

In operation, in response to receiving the clamp control signal, line clamp 6 connects together TIP lead 8 and RING lead 10 through return detector 18 thereby causing line capacitor 16 to discharge. This discharge causes the voltage of TIP lead 8 to change rapidly to about 25% of the value to which line capacitor 16 was charged. For example, if RING lead 10 is charged to a voltage of −138 volts, in response to line clamp 6 connecting together TIP lead 8 and RING lead 10, the voltage of TIP lead 8 increases to about −35 volts in about 10 microseconds (μsec).

Preferably, DRC network 84 is connected to TIP lead 8 via first relay 80 to limit the peak voltage on TIP lead 8 and to reduce the rise time of the voltage increase on TIP lead 8. In this respect, DRC network 84 shunts current when the TIP voltage is increasing. Specifically, when the TIP voltage is greater than the voltage on a capacitor 90 of DRC network 84, current flows through a diode 92 of DRC network 84 to charge capacitor 90. When the TIP voltage is less than the voltage on capacitor 90 of DRC network 84, diode 92 of DRC network 84 is reverse biased and blocks current flow from capacitor 90 to TIP lead 8. However, the charge on capacitor 90 discharges through a resistor 94 of DRC network 84. Hence, DRC network 84 shunts current away from differential amplifier 76 during peak voltage conditions.

TIP lead 8 is connected to differential amplifier 76 which includes a parallel biasing network 96 having a first, left leg 98 including in series from TIP lead 8 to isolated ground 20 a 200 ohm resistor 100, an inductor 102, diode-connected transistor 88, and a second, right leg 104, in parallel with first leg 98, including in series from TIP lead 8 to RING lead 10 a 200 ohm resistor 106 and diode-connected transistor 88'. The parallel combination of 200 ohm resistors 100 and 106 in first and second legs 98 and 104 coact to form a 100 ohm input impedance of differential amplifier 76 which limits current flow therethrough and provides a matching termination resistance.

Diode-connected transistors 88 and 88' perform a logarithm function on the current flowing through first leg 98 and second leg 104, respectively. Specifically, the voltage developed across each diode-connected transistor 88 and 88' is the logarithm of the current flowing therethrough. This increases the dynamic range of differential amplifier 76 since large increases in the currents flowing through each diode-connected transistor 88 and 88' generate relatively small voltage changes.

Differential amplifier 76 includes a discrete differential amplifier 108 connected to parallel biasing network 96. Discrete differential amplifier 108 has an emitter follower output 110 which prevents loading and subsequent gain changes of discrete differential amplifier 108. Preferably, a DC voltage applied to TIP lead 8 causes discrete differential amplifier 108 to output zero volts since equal currents flow in each leg 98 and 104 of parallel biasing network 96. In contrast, in response to a changing voltage on TIP lead 8, inductor 102 in first leg 98 of parallel biasing network 96 produces a voltage difference between legs 98 and 104 of parallel biasing network 96, with the voltage across inductor 102 corresponding to the rate of change of current therethrough according to the well-known equation $V=L di/dt$. Discrete differential amplifier 108 amplifies the difference in voltage between first and second legs 98 and 104 of parallel biasing network 96 due to the response of inductor 102 to the changing voltage on TIP lead 8 and rejects any voltage changes that occur across both diode-connected transistors 88 and 88'. Preferably, inductor 102 is most sensitive to the frequency of BT pulse 32.

It has been observed that when line clamp 6 connects TIP lead 8 and RING lead 10 together through the 100 ohm input impedance of parallel biasing network 96, the charge stored on line capacitor 16 generates discharge pulse 22 which, in turn, generates EOL pulse 28 and/or BT pulse 32. In operation, leading edge 24 of discharge pulse 22 generates a very high di/dt which is easily sensed by discrete differential amplifier 108. Back-to-back diodes 112 in parallel with inductor 102 of first leg 98 of parallel biasing network 96 limit the maximum voltage received by discrete differential amplifier 108 to avoid damage thereto.

Preferably, equal currents flow in each leg 98 and 104 of parallel biasing network 96 when the voltage of discharge pulse 22 is decaying. To this end, the inductance of inductor 102 is selected as a compromise between having inductor 102 relatively insensitive to the decay of discharge pulse 22, and relatively sensitive to leading edge 24 of discharge pulse 22, EOL pulse 28 and/or BT pulse 32. Fortunately, as discussed above, the decay of discharge pulse 22 has a substantially lower frequency than leading edge 24 of discharge pulse 22, EOL pulse 28 and/or BT pulse 32. Hence, leading edge 24 of discharge pulse 22, EOL pulse 28 and BT pulse 32 is easily detected.

Discrete differential amplifier 108 has outputs connected to an input of a first stage unity gain operational amplifier 114 having an output connected to isolation transformer 78. Isolation transformer 78 preferably includes a leakage inductance configured to coact with the input impedance of a second stage operational amplifier 116 to form therewith a single-pole low-pass L-R filter which filters high frequency noise received by discrete differential amplifier 108. A diode biasing network 118 connected between an output of isolation transformer 78 and an input of second stage operational amplifier 116 limits the voltage received thereat and, hence, the voltage received at the input of PREAMP/ADC 52. In response to receiving a signal from isolation transformer 78, second stage operational amplifier 116 generates the analog return signal which is supplied to the input of PREAMP/ADC 52. Second relay 82 selectively connects capacitors 86 and 89 in parallel to form with the input/output resistance of PREAMP/ADC 52 a single-pole high-pass R-C filter having a desired resonant frequency.

PREAMP/ADC 52 provides controlled amplification for the analog return signal and converts the analog return signal to the digital return data which is sent to DSP 44 via PLD 46 for processing and conversion into an indication of the length of trunk line 12, the position of BTs 30 on trunk line 12 and/or the length of BTs 30 connected to trunk line 12.

Figure 8:
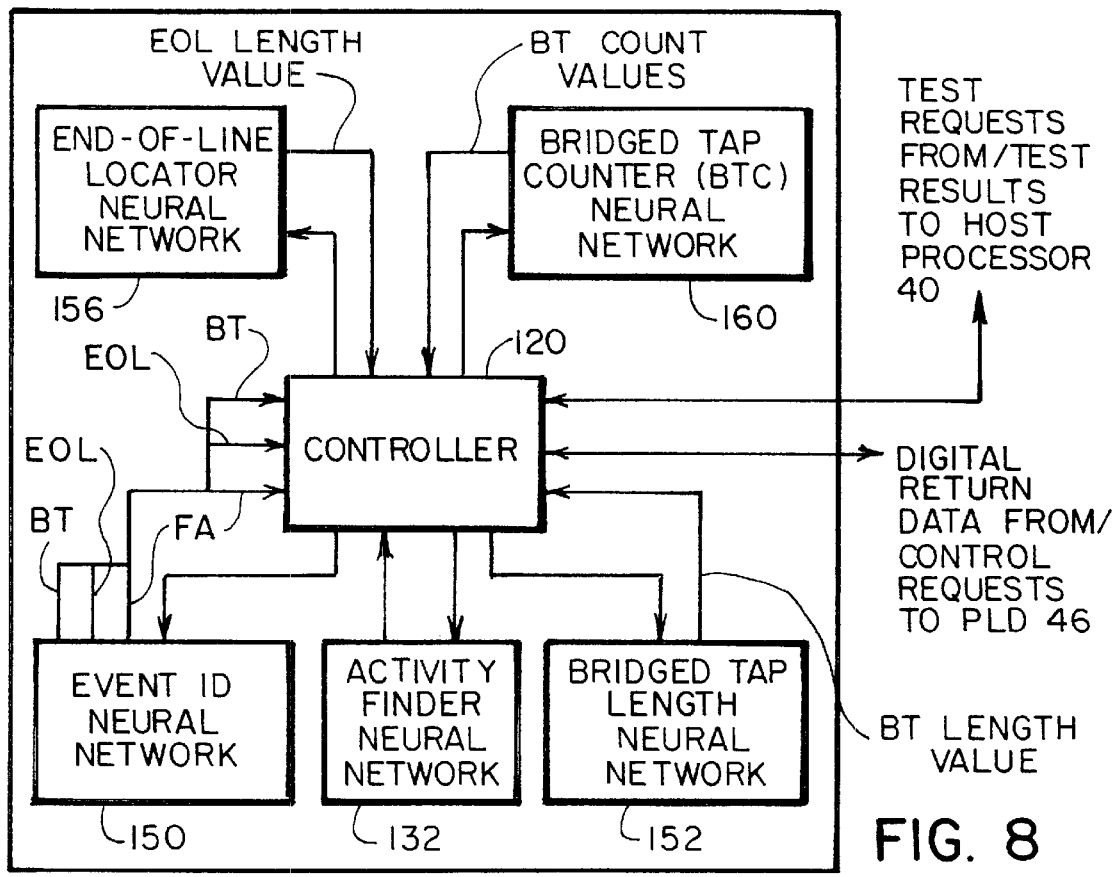
FIG. 8 is a detailed schematic drawing of the digital signal processor (DSP) of FIG. 3.

With reference to FIG. 8, and with reference back to FIGS. 2 and 3, DSP 44 preferably includes a controller 120 connected to receive test requests from host processor 40 and to supply test results to host processor 40. Controller 120 is also connected to receive the digital return data from PLD 46 and to supply control requests to PLD 46. The digital return data received from PLD 46 includes plural samples of data corresponding to the response of trunk line 12 to the discharge of line capacitor 16 during one or more sample intervals. Controller 120 stores the plural samples of data and forms therefrom a plurality of windows of sampled data, with each window including a unique subset of temporally adjacent samples of data acquired during a subinterval of each sample interval.

Each window includes a predetermined number of temporally adjacent samples of data acquired during the sample interval. For example, as shown in FIG. 2, if 560 samples of data are acquired during a first sample interval 122 and each window includes 250 temporally adjacent samples of data, controller 120 forms 310 temporally adjacent windows from the data acquired during the first sample interval 122. If the windows are ordered according to when each sample of data therein is acquired, the first window will include samples of data between sample 1 and sample 250, inclusive, the second window will include samples of data between sample 2 and sample 251, inclusive, the third window will include samples of data between sample 3 and sample 252, inclusive, and so forth, with the 310$^{th}$ window including samples of data between sample 310 and sample 560. Similarly, windows of sampled data are formed from samples of data acquired during a second sample interval 124, a third sample interval 126 and a fourth sample interval 128. As shown in FIG. 2, each sample interval 122–128 preferably overlaps its adjacent sample interval. Preferably, the samples of data forming each window are decimated by 6 prior to further processing of each window or the samples of data forming each window. However, this is not to be construed as limiting the invention. For purposes of the following description, each window will be described as including all of the samples of the data acquired therefor.

As discussed above, charge generator 4 charges line capacitor 16 to a select voltage based upon the length of trunk line 12 to be tested. In addition, charge generator 4 can charge line capacitor 16 to the select voltage based on the section of trunk line 12 to be tested. For example, if trunk line 12 has a length of 20,000 feet, charge generator 4 preferably charges line capacitor 16 to –13.2 volts in order to test the section of trunk line 12 between 0–7,000 feet. Similarly, charge generator 4 preferably charges line capacitor 16 to –54.2 volts, –138 volts, and –138 volts in order to test the sections of trunk line 12 between 6,000–12,000 feet, 10,000–16,000 feet and 15,000–20,000 feet, respectively.

During discharge of line capacitor 16, controller 120 acquires plural samples of data corresponding to the response of trunk line 12 during a corresponding sample interval 122–128. The start of each sample interval 122–128 and its duration is selected based upon the interval between leading edge 24 and the time for the portion of discharge pulse 22 corresponding to the section of trunk line 12 being tested to propagate to return detector 18. In addition, the voltage to which line capacitor 16 is charged for the length of trunk line 12 to be tested is based upon the amplitude of discharge pulse 22 that return detector 18 is configured to detect. Preferably, line capacitor 16 is discharged from –138 volts for testing sections of trunk line 12 between 10,000–16,000 feet and 15,000–20,000 feet during third sample interval 126 and fourth sample interval 128, respectively.

Discharge pulse 22 is a composite waveform formed from waveforms acquired during sample intervals 122–128. More specifically, discharge pulse 22 is formed from a first discharge waveform $22_1$ acquired during first sample interval 122, a second discharge waveform $22_2$ acquired during second sample interval 124, a third discharge waveform $22_3$ acquired during third sample interval 126, and a fourth discharge waveform $22_4$ acquired during fourth sample interval 128. For simplicity of illustration, the portions of discharge waveforms $22_1$–$22_4$ are shown as being continuous in overlapping parts of sample intervals 122–128. However, it is possible that the parts of discharge waveforms $22_1$–$22_4$ in the overlapping parts of sample intervals 122–128 are discontinuous.

As shown in FIG. 2, the sample interval during which discharge pulse 22 is sampled for a particular section of trunk line 12 is preferably selected so that the section of trunk line 12 associated with the sample interval at least partially overlaps one or more adjacent sections of trunk line 12 associated with one or more adjacent sample intervals. For example, line capacitor 16 is charged to a first voltage and plural samples of data of discharge pulse 22 are acquired during first sample interval 122 for a section of trunk line 12 between 0–7,000 feet. Similarly, line capacitor 16 is charged to a second voltage and plural samples of data of discharge pulse 22 are acquired during second sample interval 124 for a section of trunk line 12 between 6,000–12,000 feet. Still further, line capacitor 16 is charged to third and fourth voltages and plural samples of data of discharge pulse 22 are acquired during third and fourth sample intervals 126, 128 for sections of trunk line 12 between 10,000–16,000 feet and 15,000–20,000 feet, respectively.

Preferably, line capacitor 16 is charged and discharged from each voltage a plurality of times and samples of data of discharge pulse 22 are acquired during each discharge of line capacitor 16. For each voltage to which line capacitor 16 is charged and discharged, the plural samples of data of discharge pulse 22 acquired during each discharge of line capacitor 16 are averaged in order to obtain an average of each sample of data of discharge pulse 22 acquired for each voltage.

As shown in FIG. 2, for the section of trunk line 12 between 6,000–7,000 feet, plural samples of data are acquired for both the first sample interval 122 and for the second sample interval 124. Similarly, for the section of trunk line 12 between 10,000–12,000 feet, plural samples of data are acquired for both the second sample interval 124 and the third sample interval 126. Still further, for the section of trunk line 12 between 15,000–16,000 feet, plural samples of data are acquired for both the third sample interval 126 and the fourth sample interval 128.

Figure 9:
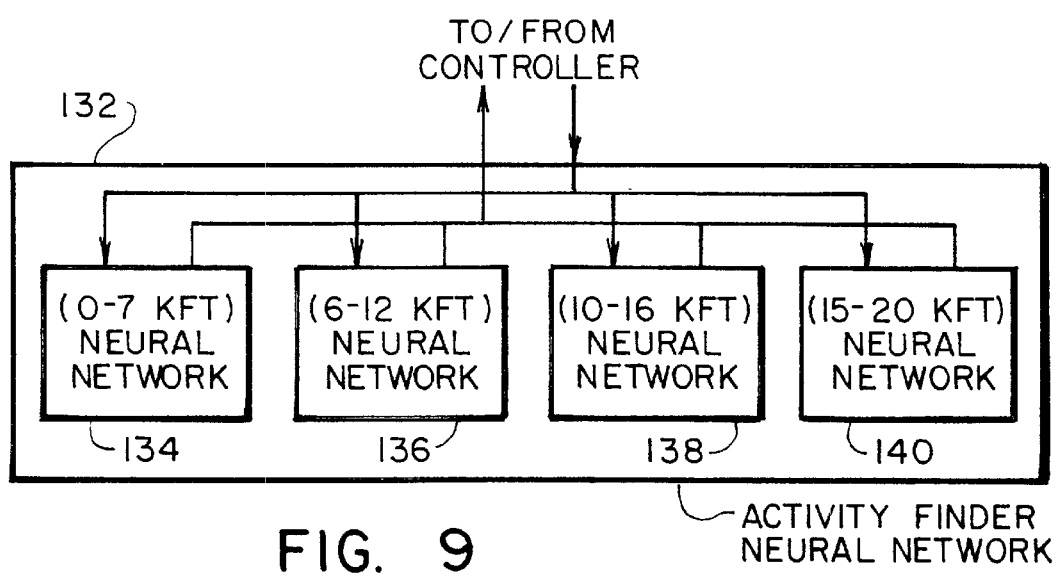
FIG. 9 is a detailed schematic drawing of the activity finder neural network of FIG. 8.

With reference to FIG. 9, and with continuing reference to FIG. 8, DSP 44 includes an activity finder neural network 132 configured to receive each window from controller 120. Preferably, activity finder neural network 132 includes neural networks 134, 136, 138 and 140 trained to process the plural samples of data acquired by controller 120 for sections of trunk line 12 between 0–7,000 feet, 6,000–12,000 feet, 10,000–16,000 feet, and 15,000–20,000 feet, respectively.

In operation, controller 120 supplies to each neural network 134–140 a window of sampled data acquired during a sample interval corresponding to the section of trunk line 12 each neural network 134–140 is trained to detect. For example, each window including samples of data acquired for a section of trunk line 12 between 0–7,000 feet is supplied to neural network 134 for processing. Similarly, windows including samples of data acquired for sections of trunk line 12 between 6,000–12,000 feet, 10,000–16,000 feet, and 15,000–20,000 feet are supplied by controller 120 to neural networks 136, 138 and 140, respectively, for processing thereby. Also supplied to each neural network 134–140 along with each window is the relative position of each window in its sample interval along with the numerical range of the samples of data of each window.

For example, discharge pulse 22 shown in FIG. 2 includes 560 samples of data that were acquired during first sample interval 122. For an exemplary window width of 250 samples of data, 310 windows of sampled data can be generated from the 560 samples of data acquired during first sample interval 122. Similarly, 230 windows of sampled data can be generated from the 480 samples of data acquired during second sample interval 124; 230 windows of sampled data can be generated from the 480 samples of data acquired during third sample interval 126; and 150 windows of sampled data can be generated from the 400 samples of data acquired during fourth sample interval 128.

Each neural network 134–140 is trained to output to controller 120 a weighting value corresponding to the samples of data included in each window received thereby, the relative position of each window in its sample interval, and the numerical range of values of each window, i.e., the difference between the maximum value and the minimum value of the samples of data comprising the window. Each weighting value output by neural networks 134–140 to controller 120 has a numerical value, preferably between 0 and 1, related to the presence or absence of BT pulse 32 or EOL pulse 28 in the corresponding window.

Figure 10A:
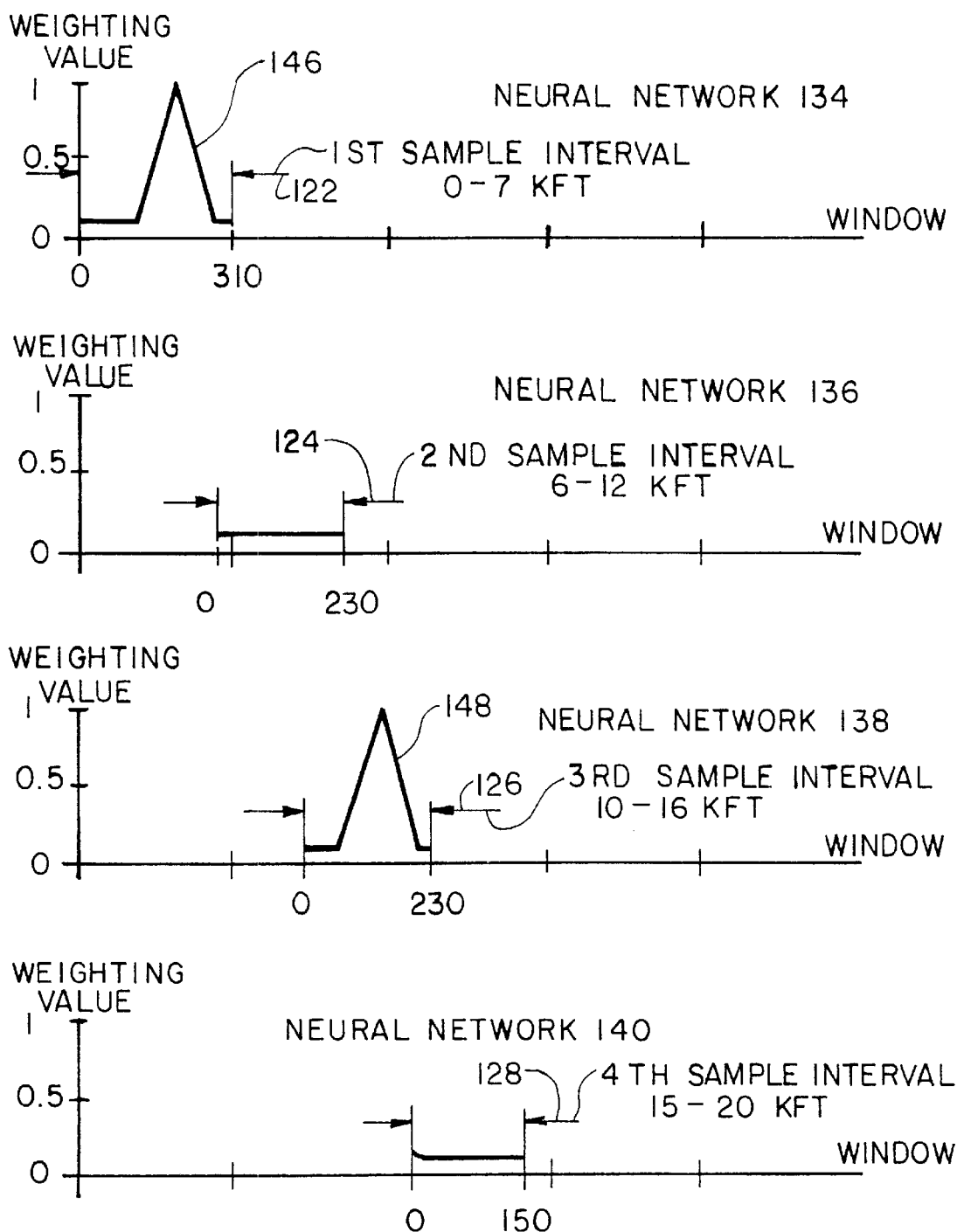
FIG. 10a is a graph of weighting value vs. window for the neural networks of the activity finder neural network of FIG. 9.

With reference to FIGS. 10a and 10b, and with continuing reference to FIGS. 2, 8 and 9, controller 120 acquires the weighting values output by neural networks 134–140 for each window received thereby and arranges or orders the weighting values according to the temporal position of their corresponding windows in their respective sample intervals. In addition, controller 120 orders the weighting values of each sample interval relative to the weighting values of adjacent sample intervals.

As shown in FIG. 10a, the portions of discharge pulse 22 not having BT pulse 32 or EOL pulse 28 superimposed thereon cause neural networks 136 and 140 to output weighting values having relatively small and relatively constant values. In contrast, BT pulse 32 and EOL pulse 28 cause neural networks 134 and 138 to output a first series of weighting values which form a first weighting value event 146 and a second series of weighting values which form a second weighting value event 148, respectively.

Controller 120 is configured to process the weighting values received from activity finder neural network 132 to detect an event characterized by the weighting values exceeding a predetermined weighting value for at least a predetermined number of windows of sampled data and for said weighting values having a predetermined shape. For example, for a range of weighting values between 0 and 1, if 10 or more adjacent weighting values exceed a predetermined weighting value of, for example 0.5, and if these 10 or more weighting values have a triangular shape, as shown in FIG. 10b, controller 120 classifies these 10 or more weighting values as a weighting value event. FIGS. 10a and 10b show first weighting value event 146 corresponding to BT pulse 32 and second weighting value event 148 corresponding to EOL pulse 28.

Next, controller 120 analyzes first weighting value event 146 to determine in which window of sampled data first weighting value event 146 is centered. For example, if the $275^{th}$ weighting value is the central weighting value of first weighting value event 146, controller 120 selects the $275^{th}$ window of sampled data for processing. Similarly, the window of sampled data associated with the central weighting value of second weighting value event 148 is selected by controller 120 for processing.

The windows of sampled data identified by controller 120 as corresponding to the central windows of the first and second weighting value events 146 and 148 are supplied by controller 120 to an event ID neural network 150. Event ID neural network 150 is trained to analyze each window of sampled data received thereby and to output therefor to controller 120 a BT value, an EOL value and a false alarm (FA) value. These values are numerical probabilities that the window of sampled data analyzed by event ID neural network 150 represents a bridged tap, e.g., BT 30, an end-of-line, e.g., EOL 26, or a false alarm. Preferably, each of these values is a number ranging between 0 and 1. Controller 120 receives the BT value, the EOL value and the FA value from event ID neural network 150. Based on which of these values is the largest numerically, controller 120 classifies the corresponding window of sampled data as a bridged tap, an end-of-line or a false alarm.

If controller 120 classifies a window of sampled data as a false alarm, controller 120 terminates processing of this window of sampled data. If, however, controller 120 classifies a window of sampled data as a bridged tap, controller 120 supplies this window of sampled data to a bridged tap length neural network 152 for processing. Bridged tap length neural network 152 is trained to process each window of sampled data received thereby and to output therefor a BT length value between 0 and 1 which controller 120 multiplies by a predetermined BT constant to obtain the length of BT 30 connected to trunk line 12. Since the samples of data forming each window of sampled data correspond to a position on trunk line 12, controller 120 can determine the position of any BT 30 connected to trunk line 12 from the temporal position of each window of sampled data associated with the windows of sampled data classified by controller 120 as a BT 30.

Next, controller 120 supplies each window of sampled data associated with the central weighting value of a weighting value event, e.g., events 146 and 148, to an EOL locator neural network 156 for processing. In addition, controller 120 supplies to EOL locator neural network 156 for each window of sampled data the corresponding BT value, EOL value, FA value, BT length value, weighting value for the window, range of numerical values of the samples of data forming the window, and the relative or temporal location of the window in the corresponding sample interval 122, 124, 126 or 128. EOL locator neural network 156 processes these inputs in accordance with its training and outputs to controller 120 for each window of sampled data processed thereby an EOL length value between 0 and 1. The window of sampled data associated with the EOL length value having the greatest numerical value is classified by controller 120 as EOL 26. All other EOL length values are ignored. The relative position of this window in the plurality of windows corresponds to the length of the telephone line.

With reference to FIG. 10c, and with continuing reference to FIGS. 1, 2 and 8, preferably, DSP 44 also includes a bridged tap counter (BTC) neural network 160 which is trained to determine the number of BTs 30 connected to trunk line 12. In operation, BTC neural network 160 receives via controller 120 the weighting values output by activity finder neural network 132 for each window of sampled data. BTC neural network 160 forms from these weighting values a first trace 142 (shown as a solid line) of weighting values and a second trace 144 (shown as a dashed-dot line) of weighting values.

Each of first and second traces 142 and 144 includes the weighting values of each sample interval that does not have for the same section of trunk line 12 a weighting value associated with an adjacent sample interval. For example, each of first and second traces 142 and 144 includes the weighting values associated with the sections of trunk line 12 between 0–6,000 feet; 7,000–10,000 feet; 12,000–15,000 feet; and 16,000–20,000 First and second traces 142 and 144 associated with these sections of trunk line 12 are offset in FIG. 10c for illustration purposes. However, it is to be appreciated that first and second traces 142 and 144 associated with these sections of trunk line 12 are coincident.

In addition, first trace 142 includes for each section of trunk line 12 associated with overlapping portions of sample intervals the maximum weighting values, and second trace 144 includes for the same sections of trunk line 12 the minimum values. For example, as shown in FIG. 2, first sample interval 122 and second sample interval 124 each have 80 samples of data for the section of trunk line 12 between 6,000–7,000 feet. In FIG. 10b, these 80 samples of data for each of first and second sample intervals 122 and 124 produce for the section of trunk line 12 between 6,000–7,000 feet 80 pairs of weighting values, with one of each pair of weighting values corresponding to the windows associated with the first sample interval 122 and with the other of each pair of weighting values corresponding to windows associated with second sample interval 124. Similarly, the sections of trunk line 12 between 10,000–12,000 feet and between 15,000–16,000 feet have 160 pairs of weighting values and 80 pairs of weighting values, respectively, associated therewith.

In operation, controller 120 associates the weighting value of each pair of weighting values having the greater numerical value with first trace 142, and associates the weighting value of each pair of weighting values having the lesser numerical value with second trace 144.

In FIG. 10b, the weighting values associated with the portions of first and third sample intervals 122 and 126 are shown as having greater numerical values that overlap second and fourth sample intervals 124 and 128. However, for each section of trunk line 12 having two sample intervals associated therewith, the weighting value for each sample interval can either be the greater numerical value or the lesser numerical value. For example, for a first pair of weighting values for the section of trunk line 12 between 6,000–7,000 feet, the weighting value of first sample interval 122 can have the greater numerical value, e.g., 0.1, and the weighting value of second sample interval 124 can have the lesser numerical value, e.g., 0.09, or vice versa. Similar comments apply in respect of each other pair of weighting values associated with the section of trunk line 12 between 6,000–7,000 feet, the 160 pairs of weighting values associated with the section of trunk line 12 between 10,000–20,000 feet, and the 80 pairs of weighting values associated with the section of trunk line 12 between 15,000–20,000 feet.

For each of first and second traces 142 and 144 of weighting values, BTC neural network 160 determines for each of nine predetermined threshold weighting values (i) an area of the trace above the threshold, (ii) a sum of the area determined in step (i) and the area of the trace immediately therebelow, and for each of nine predetermined percentages (iii) a weighting value where a total area of the trace is thereabove.

An example of steps (i) and (ii) above will now be described with reference to FIG. 10d for weighting value trace 142. In step (i), for a predetermined threshold weighting value of 0.5, BTC neural network 160 determines an area 162 of first weighting value event 146 above said predetermined threshold weighting value and an area 164 of second weighting value event 148 above said predetermined threshold weighting value. BTC neural network 160 then sums together areas 162 and 164 to determine the total area of weighting value trace 142 above the predetermined threshold weighting value of 0.5. In step (ii), BTC neural network 160 determines areas 166 and 168 immediately below the base of areas 162 and 164, respectively. BTC neural network 160 then sums together areas 162, 164, 166 and 168 to determine the total area of weighting value trace 142 where areas 162 and 164 are above the predetermined threshold weighting value of 0.5. Steps (i) and (ii) are repeated for predetermined threshold weighting values 0.1, 0.2, 0.3, 0.4, 0.6, 0.7, 0.8 and 0.9. In addition, steps (i) and (ii) are repeated for weighting value trace 144. In addition, step (iii) is repeated for weighting value trace 144.

An example of step (iii) above will now be described with reference to FIG. 10e for weighting value trace 142. In step (iii), BTC neural network 160 determines a total area of weighting value trace 142. Next, BTC neural network 160 determines from the total area of weighting value trace 142 a predetermined percentage thereof. BTC neural network 160 then determines a weighting value where the area of weighting value trace 142 thereabove corresponds to the predetermined percentage of the total area of weighting value trace 142. For example, assume that BTC neural network 160 determines that weighting value trace 142 has a total area of 100 units. Next, assume that BTC neural network 160 is configured to determine the area of weighting value trace 142 representing 50% of this total area, or 50 units. To effect this determination, BTC neural network 160 determines a weighting value whereabove the area of weighting value trace 142 equals 50 units. In the example shown in FIG. 10e, BTC neural network 160 determines that the sum of areas 170 and 172 above weighting value 0.3 equals 50% of the total area of weighting value trace 142. BTC neural network 160 repeats step (iii) for predetermined percentages 10%, 20%, 30%, 40%, 60%, 70%, 80% and 90%.

Based on the foregoing, it can be seen that for each weighting value trace 142 and 144, BTC neural network 160 determines 27 values (18 area values and 9 weighting values) for a total of 54 values for both weighting value traces 142 and 144.

Figure 11:
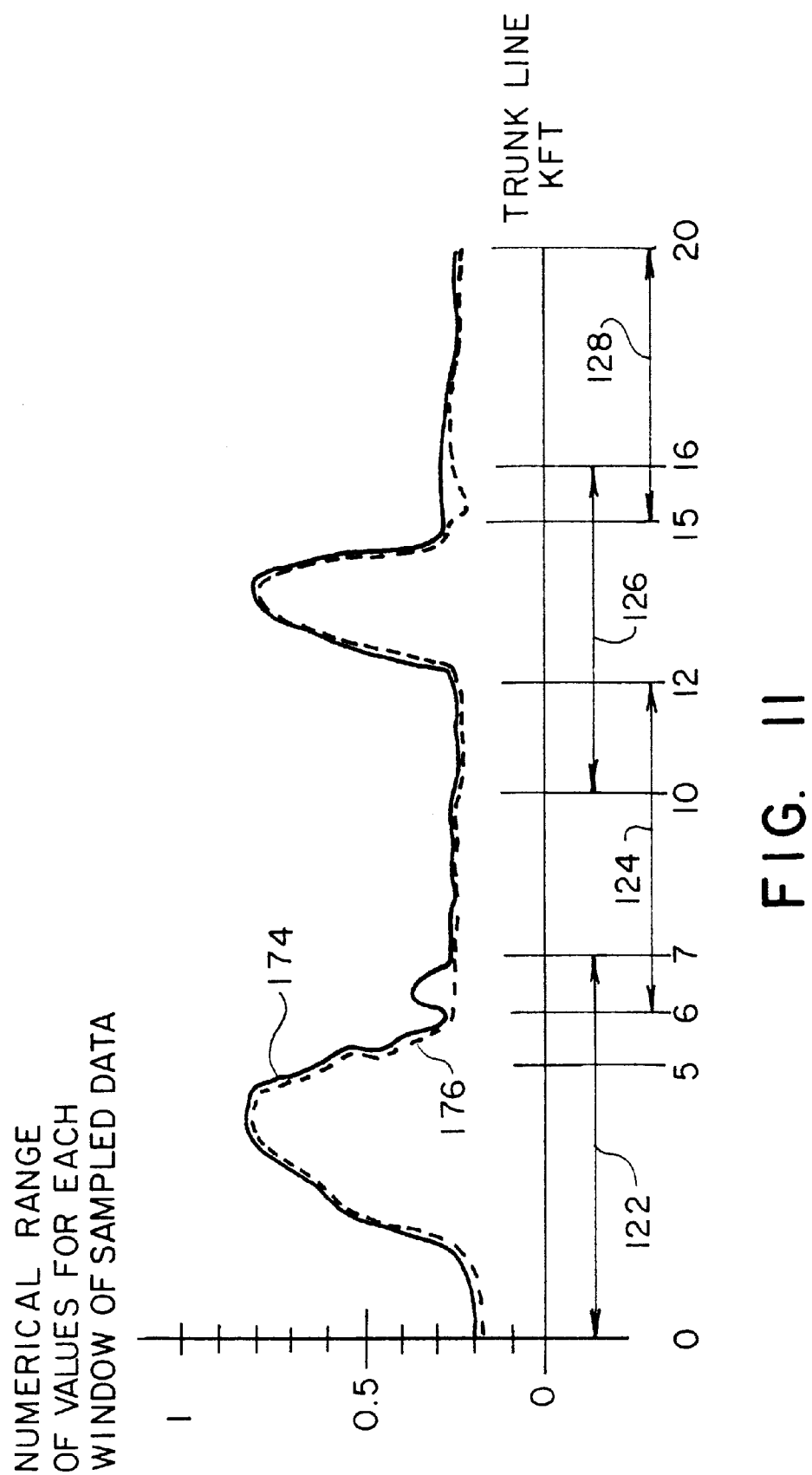
FIG. 11 is a graph of numerical range of values for each window of sampled data vs. windows of sampled data.

With reference to FIG. 11, BTC neural network 160 also receives from controller 120 the numerical range of values of the samples of data comprising each window. Recall from FIG. 2 that each sample interval 122–128 overlaps adjacent sample intervals. Each section of trunk line 12 associated with overlapping portions of sample intervals 122–128 includes pairs of numerical ranges of values, with one of each pair being associated with one sample interval for the section of trunk line 12 and with the other of each pair being associated with the other sample interval for the same section of trunk line 12. Since non-overlapping portions of each sample interval 122–128 only include one window for each section of trunk line 12, only one numerical range is generated for each section of trunk line 12 associated with the non-overlapping portions of sample intervals 122–128. Based on the temporal positions of the corresponding windows of sampled data, BTC neural network 160 arranges the larger range of values into a third trace 174 and arranges the smaller range of values to a fourth trace 176. Each of third trace 174 and fourth trace 176 includes the numerical range of values for each window of a portion of sample intervals 122–128 that does not overlap another sample interval. In addition, third trace 174 includes for each section of trunk line 12 associated with overlapping portions of sample intervals 122–128 the larger range of the pair of ranges of values, and fourth trace 176 includes the smaller range of the pair of ranges of values. In FIG. 11, third trace 174 and fourth trace 176 are offset from each other in the non-overlapping portions of sample intervals 122–128 for illustration purposes. However, it is to be appreciated that in the non-overlapping portions of sample intervals 122–128, third trace 174 and fourth trace 176 would have the same range of values for each section of trunk line 12. In contrast, as shown in FIG. 11, for the sections of trunk line 12 having overlapping portions of sample intervals associated therewith, the larger range of numerical values for each section of trunk line 12 is included in third trace 174 and the smaller range of numerical values for each section of trunk line 12 is included with fourth trace 176. In FIG. 11, the numerical values of traces 174 and 176 are normalized for illustration and discussion purposes. However, this is not to be construed as limiting the invention. Next, BTC neural network 160 determines for each of the third and fourth traces 174 and 176 areas thereof above nine predetermined threshold numerical values, e.g., numerical values 0.1, 0.2, 0.3, 0.4, 0.5, 0.6, 0.7, 0.8 and 0.9 for the normalized numerical values of FIG. 11, for a total of 18 areas for both the third and fourth traces 174 and 176.

Preferably, controller 120 scales the 54 values determined from the first and second traces 142 and 144 of weighting values and the 18 areas determined from the third and fourth traces 174 and 176 of sampled data to a range between 0 and 1. BTC neural network 160 then processes these scaled values and scaled areas in accordance with its training and outputs to controller 120 three bridged tap count values which represent an estimate of whether trunk line 12 includes zero, one or two bridged taps. More specifically, the three BT count values output by BTC neural network 160 represent points in a three-dimensional Euclidean space. In this space, the XYZ coordinate 1,0,0 represents zero bridged taps; the XYZ coordinate 0,1,0 represents one bridged tap; and the XYZ coordinate 0,0,1 represents two bridged taps. Controller 120 plots the three BT count values in Euclidean space and determines which BT count value is closest to an XYZ coordinate related to zero bridged tap, one bridged tap or two bridged taps. The XYZ coordinate closest to a BT count value is selected by controller 120 to represent the number of bridged taps connected to trunk line 12.

The number of bridged taps connected to trunk line 12, as determined by the BT count value selected by controller 120, is compared to the number of BTs 30 determined from the outputs of event ID neural network 150 and EOL locator neural network 156. If the output of BTC neural network 160 indicates that trunk line 12 has more BTs 30 than the output of the event ID neural network 150, the BT count values output by BTC neural network 160 are ignored and the loop configuration of trunk line 12 determined by event ID neural network 150 and EOL locator neural network 156 is reported by controller 120 to host processor 40. In contrast, if the output of BTC neural network 160 indicates that trunk line 12 has less BTs 30 than the output of event ID neural network 150, controller 120 ignores BTs 30 having lengths below 300 feet and reports to host processor 40 the loop configuration of trunk line 12 determined by event ID neural network 150 and EOL locator neural network 156 absent BTs 30 having a length below 300 feet. Lastly, if the number of BTs 30 determined by the BT count value corresponds to the number of BTs 30 determined from the outputs of event ID neural network 150 and EOL locator neural network 156, controller 120 reports this loop configuration to host processor 40.

The invention has been described with reference to the preferred embodiment. Obvious modifications and alterations will occur to others upon reading and understanding the preceding detailed description. For example, while described in connection with detecting EOL 26 of trunk line 12 and/or the location where a BT 30 is connected to trunk line 12 and the length of said BT 30, the invention can also be utilized to detect for the presence of load coils connected to trunk line 12, changes in the gauge of tip lead 8 and/or ring lead 10 of trunk line 12, and/or faults or partially broken leads of tip lead 8 and/or ring lead 10 of trunk line 12. To this end, event ID neural network 150 can be trained to analyze each window of sampled data received thereby for a load coil, change in the gauge of tip lead 8 and/or ring lead 10 of trunk line 12 and/or faults or partially broken leads in tip lead 8 and/or ring lead 10 of trunk line 12 and to output to controller 120 corresponding values therefor. The value associated with each of a load coil, change of gauge and/or faults or partially broken leads, like the BT value discussed above, are numerical probabilities that the window of sampled data analyzed by event ID neural network 150 represents a load coil, a change in gauge and/or a fault or partially broken lead. Controller 120 can analyze these values along with the BT value, the EOL value and the FA value, discussed above, and can classify the corresponding window of sampled data accordingly. It is to be appreciated that event ID neural network 150 essentially detects discontinuities in trunk line 12, which discontinuities can include a BT 30, an EOL 26, a load coil, changes in the gauge of tip lead 8 and/or ring lead 10 of trunk line 12, and/or faults or partially broken leads of tip lead 8 and/or ring lead 10 of trunk line 12. Accordingly, by suitably training event ID neural network 150, these discontinuities, and others, are capable of being detected by the present invention. Moreover, while DSP 44, shown in FIG. 8, is described in connection with processing one or more discharge pulses 22 produced by delay-line time-domain reflectometer 2, DSP 44 can also be configured to process one or more reflection pulses produced on trunk line 12 utilizing traditional time-domain reflectometry techniques. It is intended that the invention be construed as including all such modifications and alterations insofar as they come within the scope of the appended claims or the equivalents thereof.

We claim:

1. An apparatus for detecting discontinuities of a telephone line, the apparatus comprising:
   means for electrically stimulating a telephone line;
   a return detector for acquiring plural samples of data corresponding to the response of the telephone line to the electrical stimulation during at least one sample interval;
   a controller for storing the plural samples of data and for forming therefrom a plurality of windows of sampled data, with each window including a unique subset of the plural samples of data;
   an activity finder configured to receive each of the plurality of windows and to output a weighting value for each window as a function of at least one of (i) numerical values of the unique subset of the plural samples of data of the window, (ii) a relative position of the window in the plurality of windows, and (iii) a numerical range of values of the unique subset of the plural samples of data of the window, with the controller detecting a predetermined event from a subset of the weighting values and selecting one of the plurality of windows as a function of one weighting value of the subset of weighting values; and
   an event identifier configured to process the one window and to output to the controller as a function thereof a first value which is a numerical probability that the one window represents a discontinuity of the telephone line.

2. The apparatus as set forth in claim 1, wherein the event identifier outputs to the controller a second value which is a numerical probability that the one window represents the end-of-line (EOL) of the telephone line.

3. The apparatus as set forth in claim 2, wherein the first value is a bridged tap (BT) value which relates to a position on the telephone line where a BT is connected and the second value is an EOL value.

4. The apparatus as set forth in claim 3, further including a BT length identifier configured to process the one window when the BT value is greater than the EOL value and to output to the controller as a function thereof a BT length value.

5. The apparatus as set forth in claim 4, further including an EOL locator configured to process the one window and at least two of the BT value, the EOL value, the BT length value, the one weighting value of the subset of weighting values, the range of numerical values of the unique subset of the plural samples of data, and the relative location of the one window in the plurality of windows and outputs to the controller as a function thereof an EOL length value, wherein:

when the BT value is greater than the EOL value, the BT length value corresponds to the length of a BT connected to the telephone line and the relative position of the one window in the plurality of windows corresponds to a position on the telephone line where the BT is connected; and when the EOL value is greater than the BT value, the relative position of the one window in the plurality of windows corresponds to a length of the telephone line.

6. The apparatus as set forth in claim 1, wherein:

the electrical stimulation includes a first pulse corresponding to a first section of the telephone line and a second pulse corresponding to a second section of the telephone line which is partially coincident with the first section of the telephone line;

the response of the telephone line includes a first waveform corresponding to a response of the telephone line to the first pulse and a second waveform corresponding to a response of the telephone line to the second pulse; and a part of the first waveform and a part of the second waveform represent the response of the telephone line where the first section of the telephone line is partially coincident with the second section of the telephone line.

7. The apparatus as set forth in claim 6, wherein:

a first subset of the plurality of windows is associated with the part of the first waveform and a second subset of the plurality of windows is associated with the part of the second waveform; and the activity finder determines for each window of the first subset of the plurality of windows a first weighting value associated with the first waveform and determines for each window of the second subset of the plurality of windows a second weighting value associated with the second waveform, wherein each first weighting value forms with one of the second weighting values a pair of weighting values having their respective windows including samples of data related to the same section of the telephone line.

8. The apparatus as set forth in claim 7, further including a BT counter for:

receiving the weighting values of the plurality of windows;

forming from the received weighting values a first trace which includes weighting values associated with the first waveform and weighting values associated with the second waveform and which excludes for each pair of related first and second weighting values the minimum thereof;

forming from the received weighting values a second trace which includes weighting values associated with the first waveform and weighting values associated with the second waveform and which excludes for each pair of related first and second weighting values the maximum thereof; and processing the first trace and the second trace to obtain a count of bridged taps connected to the telephone line.

9. The apparatus as set forth in claim 8, wherein processing the first trace and the second trace includes:

determining for each of a plurality of predetermined threshold weighting values two or more of (i) a first value corresponding to an area of the first trace which is greater than the predetermined threshold weighting value, (ii) a second value corresponding to an area of the second trace which is greater than the predetermined threshold weighting value, (iii) a third value corresponding to a total area of the first trace which is associated with the area thereof which is greater than the predetermined threshold weighting value, and (iv) a fourth value corresponding to a total area of the second trace which is associated with the area thereof which is greater than the predetermined threshold weighting value;

determining for each of a plurality of percentages at least one of (i) a first weighting value where a ratio of an area of the first trace above the first weighting value to the total area of the first trace equals the percentage and (ii) a second weighting value where a ratio of the area of the second trace above the second weighting value to the total area of the second trace equals the percentage; and determining from two or more of the first through fourth values and at least one of the first and second weighting values at least one BT count value corresponding to the number of bridged taps connected to the telephone line.

10. The apparatus as set forth in claim 8, wherein the BT counter:

receives for each window the numerical range of values of the samples of data thereof, with the numerical range of values for each window being a difference between the largest numerical value and the smallest numerical value of the window;

based on the temporal positions of the corresponding windows of sampled data, arranges the largest range values into a third trace which excludes the smallest range value of each pair of ranges of values associated with the same section of the telephone line and arranges the smallest range values into a fourth trace which excludes the largest range value of each pair of ranges of values associated with the same section of the telephone line;

for a plurality of predetermined threshold numerical values, determines areas of the third trace and the fourth trace above each predetermined threshold numerical value; and determines from the areas above each predetermined threshold numerical value at least one BT count value corresponding to the number of bridged taps connected to the telephone line.

11. The apparatus as set forth in claim 8, wherein the functions performed by the activity finder, the event finder, the BT length identifier, the EOL finder or the BT counter are implemented in one or more trained neural networks.

12. The apparatus as set forth in claim 1, wherein the samples of data forming each window of sampled data are decimated by N prior to the activity finder receiving each window.

13. The apparatus as set forth in claim 12, wherein N equals six (N=6).

14. The apparatus as set forth in claim 1, wherein the means for electrically stimulating includes:
- a charge generator for charging the telephone line to at least one predetermined voltage; and
- a line clamp for connecting together two or more conductive wires which form the telephone line.

15. An apparatus for detecting a discontinuity of a telephone line, the apparatus comprising:
- means for electrically stimulating a telephone line;
- return detector for detecting during a sample interval a response waveform produced by the telephone line in response to the electrical stimulation;
- a controller for storing the response waveform and for forming therefrom a plurality of windows, with each window corresponding to a unique part of the response waveform;
- an activity finder for determining a weighting value for each window as a function of at least two of (i) changes in the response waveform in the window, (ii) the temporal position of the window in the plurality of windows, and (iii) the range of the response waveform in the window, with the controller detecting a predetermined event in a subset of the weighting values and selecting one of the plurality of windows as a function of one weighting value of the subset of weighting values; and
- an event identifier for processing the one window to produce a first value which is a numerical probability that the one window represents a discontinuity on the telephone line.

16. The apparatus as set forth in claim 15, wherein the event identifier outputs a second value which is a numerical probability that the one window represents an end-of-line (EOL) of the telephone line.

17. The apparatus as set forth in claim 16, wherein the first value is a BT value and the second value is an EOL value.

18. The apparatus as set forth in claim 17, further including a BT length identifier for processing the one window when the BT value is greater than the EOL value to produce a BT length value.

19. The apparatus as set forth in claim 17, further including an EOL locator for determining an EOL length value as a function of at least two of the BT value, the EOL value, the BT length value, the one weighting value of the subset of weighting values, the range of the response waveform in the one window, and the relative position of the one window in the plurality of windows, wherein:
- when the BT value is greater than the EOL value, the BT length value corresponds to the length of a bridged tap connected to the telephone line and corresponds to a position on the telephone line where the bridged tap is connected; and
- when the EOL value is greater than the BT value, the temporal position of the one window in the plurality of windows corresponds to a length of the telephone line.

20. The apparatus as set forth in claim 15, wherein:
- the electrical stimulation includes a first pulse related to a first section of the telephone line and a second pulse related to a second section of the telephone line which is partially coincident with the first section of the telephone line;
- the response waveform includes a first waveform corresponding to the response of the telephone line to the first pulse and a second waveform corresponding to the response of the telephone line to the second pulse; and
- a part of the first waveform and a part of the second waveform correspond to the response of the telephone line where the first section of the telephone line is partially coincident with the second section of the telephone line.

21. The apparatus as set forth in claim 20, wherein:
- the part of the first waveform has a first subset of windows associated therewith and the part of the second waveform has a second subset of windows associated therewith; and
- the activity finder determines for each window of the first subset of windows a first weighting value associated with the first waveform and determines for each window of the second subset of windows a second weighting value associated with the second waveform, wherein each first weighting value is related to one of the second weighting values based on their respective windows including samples of data related to the same section of the telephone line.

22. The apparatus as set forth in claim 21, further including a BT counter for:
- receiving the weighting values of the plurality of windows;
- forming from the received weighting values a first trace which includes weighting values associated with the first waveform and weighting values associated with the second waveform and which excludes the minimum of each first weighting value or its related second weighting value;
- forming from the received weighting values a second trace which includes weighting values associated with the first waveform and weighting values associated with the second waveform and which excludes the maximum of each first weighting value or its related second weighting value; and
- processing the first trace and the second trace to obtain a count of bridged taps connected to the telephone line.

23. The apparatus as set forth in claim 22, wherein processing the first trace and the second trace includes:
(a) determining an area of the first trace which is greater than a predetermined weighting value;
(b) determining a total area of the first trace which is associated with the area greater than the predetermined weighting value;
(c) determining an area of the first trace corresponding to a predetermined percentage of the total area of the first trace;
(d) determining an area of the second trace which is greater than the predetermined weighting value;
(e) determining a total area of the second trace which is associated with the area greater than the predetermined weighting value;
(f) determining an area of the second trace corresponding to the predetermined percentage of the total area of the second trace; and
(g) determining from the results determined in steps (a) through (f) a number of bridged taps connected to the telephone line.

24. The apparatus as set forth in claim 22, wherein processing the first trace and the second trace includes:
  providing a plurality of predetermined weighting values;
  determining for each predetermined weighting value a first value corresponding to an area of the first trace which is greater than the predetermined weighting value;
  determining for each predetermined weighting value a second value corresponding to an area of the second trace which is greater than the predetermined weighting value;
  determining for each predetermined weighting value a third value corresponding to a total area of the first trace which is associated with the area thereof which is greater than the predetermined weighting value;
  determining for each predetermined weighting value a fourth value corresponding to a total area of the second trace which is associated with the area thereof which is greater than the predetermined weighting value;
  providing a plurality of percentages;
  determining for each percentage a first weighting value where a ratio of an area of the first trace above the first weighting value and the total area of the first trace equals the percentage;
  determining for each percentage a second weighting value where a ratio of an area of the second trace above the second weighting value and the total area of the second trace equals the percentage; and
  determining from the first through fourth values and the first and second weighting values the number of bridged taps connected to the telephone line.

25. The apparatus as set forth in claim 22, wherein the BT counter:
  receives for each window a numerical range of values for the range of the response waveform, with the numerical range of values for each window being a difference between the maximum numerical value and the minimum numerical value of the window;
  based on the temporal positions of the corresponding windows of sampled data, arranges the maximum range values into a third trace which excludes the minimum range value of each pair of ranges of values associated with the same section of the telephone line and arranges the minimum range values into a fourth trace which excludes the maximum range value of each pair of ranges of values associated with the same section of the telephone line;
  for a plurality of predetermined threshold numerical values, determines areas of the third trace and the fourth trace above each predetermined threshold numerical value; and
  determines as a function of the areas above each of the predetermined numerical threshold values at least one BT count value corresponding to the number of bridged taps connected to the telephone line.

26. The apparatus as set forth in claim 24, wherein:
  the plurality of predetermined weighting values is nine; and
  the plurality of percentages is nine.

27. The apparatus as set forth in claim 26, wherein the nine percentages are 10%, 20%, 30%, 40%, 50%, 60%, 70%, 80% and 90%.

28. A method of testing a telephone line comprising the steps of:
  electrically stimulating a telephone line;
  detecting during a sample interval a response waveform produced by the telephone line in response to the electrical stimulation;
  storing the response waveform and forming therefrom a plurality of windows, with each window corresponding to a unique part of the response waveform;
  determining a weighting value for each window as a function of at least two of (i) changes in the response waveform in the window, (ii) the temporal location of the window in the sample interval, and (iii) the range of the response waveform in the window;
  detecting a predetermined event in a subset of the weighting values and selecting one of the plurality of windows as a function of one of the weighting values of the subset of weighting values; and
  processing the one window to produce a first value which is a numerical probability that the one window represents a discontinuity of the telephone line.

29. The method as set forth in claim 28, wherein processing the one window produces at least one of a second value and a third value, where the second value is a numerical probability that the one window represents an end-of-line (EOL) of the telephone line.

30. The method as set forth in claim 29, wherein the first, second and third values are a BT value, an EOL value and a BT length value, respectively.

31. The method as set forth in claim 30, further including the step of determining an EOL length value as a function of at least two of the BT value, the EOL value, the BT length value, the one weighting value of the subset of weighting values, the range of the response waveform in the one window, and the temporal location of the one window in the sample interval, wherein:
  when the BT value is greater than the EOL value, the BT length value corresponds to the length of a bridged tap connected to the telephone line, and the temporal location of the one window in the sample interval corresponds to a position on the telephone line where the bridged tap is connected; and
  when the EOL value is greater than the BT value, the temporal location of the one window in the sample interval corresponds to a length of the telephone line.

32. The method as set forth in claim 28, wherein:
  the response waveform includes a first waveform corresponding to the response of a first part of the telephone line and a second waveform corresponding to the response of a second part of the telephone line; and
  a part of the first waveform and a part of the second waveform correspond to the response of the telephone line where the first part of the telephone line is partially coincident with the second part of the telephone line.

33. The method as set forth in claim 32, wherein:
  the part of the first waveform and the part of the second waveform each have one or more windows associated therewith; and
  each window of the part of the first waveform is related to one window of the part of the second waveform based on their respective waveforms being related to a common section of the telephone line.

34. The method as set forth in claim 33, further including the steps of:
  determining for each window of the first waveform a first weighting value; and
  determining for each window of the second waveform a second weighting value.

35. The method as set forth in claim 34, further including the steps of:

forming from the weighting values a first trace which includes weighting values related to the first waveform and weighting values related to the second waveform and which excludes the minimum of each first weighting value or its related second weighting value;

forming from the weighting values a second trace which includes weighting values related to the first waveform and weighting values related to the second waveform and which excludes the maximum of each first weighting value or its related second weighting value; and processing the first trace and the second trace to obtain a count of bridged taps connected to the telephone line.

36. The method as set forth in claim 35, wherein the step of processing the first trace and the second trace includes the steps of:

(a) determining an area of the first trace which is greater than a predetermined weighting value;

(b) determining a total area of the first trace which is associated with the area greater than the predetermined weighting value;

(c) determining a range of weighting values forming the first trace;

(d) determining an area of the first trace corresponding to a predetermined percentage of the total area of the first trace;

(e) determining an area of the second trace which is greater than the predetermined weighting value;

(f) determining a total area of the second trace which is associated with the area greater than the predetermined weighting value;

(g) determining a range of weighting values forming the second trace;

(h) determining an area of the second trace corresponding to a predetermined percentage of the total area of the second trace; and (i) combining the results determined in steps (a) through (h) to obtain a count of bridged taps connected to the telephone line.

37. The method as set forth in claim 35, wherein the step of processing the first trace and the second trace includes the steps of:

providing a plurality of predetermined weighting values;

determining for each predetermined weighting value a first value corresponding to an area of the first trace which is greater than the predetermined weighting value;

determining for each predetermined weighting value a second value corresponding to an area of the second trace which is greater than the predetermined weighting value;

determining for each predetermined weighting value a third value corresponding to a total area of the first trace which is associated with the area thereof which is greater than the predetermined weighting value;

determining for each predetermined weighting value a fourth value corresponding to a total area of the second trace which is associated with the area thereof which is greater than the predetermined weighting value;

providing a plurality of percentages;

determining for each percentage a first weighting value where a ratio of an area of the first trace above the first weighting value and the total area of the first trace equals the percentage;

determining for each percentage a second weighting value where a ratio of an area of the second trace above the second weighting value and the total area of the second trace equals the percentage; and determining from the first through fourth values and the first and second weighting values the number of bridged taps connected to the telephone line.

38. The method as set forth in claim 35, further including the steps of:

determining a numerical range of samples of data forming the response waveform in each window, with the numerical range of the samples of data being a difference between a maximum value of the samples of data in the window and a minimum value of the samples of data in the window;

based on the temporal positions of each window of the plurality of windows, arranging the maximum range values into a third trace which excludes the minimum range value of each pair of ranges of values associated with the same section of the telephone line and arranging the minimum range values into a fourth trace which excludes the maximum range value of each pair of ranges of values associated with the same section of the telephone line;

providing a plurality of predetermined threshold numerical values;

determining areas of the third trace and the fourth trace above each predetermined threshold numerical value; and determining as a function of the areas of the third and fourth traces above each of the predetermined numerical threshold values, the number of bridged taps connected to the telephone line.

* * * * *

UNITED STATES PATENT AND TRADEMARK OFFICE
CERTIFICATE OF CORRECTION

PATENT NO. : 6,574,311 B1  Page 1 of 1
DATED : June 3, 2003
INVENTOR(S) : Rebecca Webb Ross et al.

It is certified that error appears in the above-identified patent and that said Letters Patent is hereby corrected as shown below:

Column 1,
Line 31, "Borchertetal." should read -- Borchert et al. --.

Column 9,
Line 29, "13.2" should read -- - 13.2 --.
Line 30, "54.2" should read -- - 54.2 --.
Line 31, "138" should read -- -138 --.

Column 16,
Line 63, "16,000-20,000 First" should read -- 16-000-20,000 feet. First --.

Column 17,
Line 63, "(ii)." should read -- (ii), --.

Signed and Sealed this

Eighteenth Day of November, 2003

JAMES E. ROGAN
*Director of the United States Patent and Trademark Office*